United States Patent
Akimoto et al.

(10) Patent No.: US 8,583,302 B2
(45) Date of Patent: Nov. 12, 2013

(54) ELECTRIC VEHICLE

(75) Inventors: Kazushi Akimoto, Wako (JP); Toru Takenaka, Wako (JP); Hiroshi Gomi, Wako (JP); Shinichiro Kobashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 467 days.

(21) Appl. No.: 12/889,667

(22) Filed: Sep. 24, 2010

(65) Prior Publication Data
US 2011/0071715 A1 Mar. 24, 2011

(30) Foreign Application Priority Data

Sep. 24, 2009 (JP) ................................ 2009-219761

(51) Int. Cl.
*B62D 61/02* (2006.01)
*B60K 17/30* (2006.01)
*B62D 6/00* (2006.01)
*B60L 11/00* (2006.01)

(52) U.S. Cl.
USPC ............ 701/22; 701/41; 180/6.24; 180/21; 180/252; 180/219; 180/220

(58) Field of Classification Search
USPC ........ 701/1, 22, 41; 180/6.2, 6.24, 6.28, 6.62, 180/21, 252, 218, 219, 220, 223, 210, 211, 180/214, 215, 65.1, 315, 316, 326, 328, 180/329; 700/245, 264
See application file for complete search history.

(56) References Cited

U.S. PATENT DOCUMENTS

| | | | |
|---|---|---|---|
| 4,413,693 A | * | 11/1983 | Derby ........................... 180/343 |
| 2011/0012721 A1 | * | 1/2011 | Kamen et al. ................. 340/439 |

FOREIGN PATENT DOCUMENTS

| | | |
|---|---|---|
| JP | 2004-344435 A | 12/2004 |
| JP | 2006-102387 A | 4/2006 |
| JP | 2009-040165 A | 2/2009 |
| WO | 2008/139740 A1 | 11/2008 |

OTHER PUBLICATIONS

JP Office Action, issued in corresponding JP Application 2009-219761, mailing date of May 28, 2013.

* cited by examiner

*Primary Examiner* — Christine Behncke

(74) *Attorney, Agent, or Firm* — Carrier Blackman & Associates, P.C.; William D. Blackman; Michael J. McCandlish

(57) ABSTRACT

An electric vehicle includes a base; a front wheel that can be driven omnidirectionally; a rear wheel that is mounted on the base so that a symmetry axis is parallel with a symmetry axis of the front wheel; a seat member that is mounted so that a straight line connecting a wheel center of the front wheel and a wheel center of the rear wheel specifies a fore-and-aft direction; an controller that detects an acceleration and deceleration command and a turning command; an inclination sensor that detects inclination of the base; and a control unit that controls acceleration and deceleration of the base based on the acceleration and deceleration command detected by the controller, that controls turning of the base based on the turning command detected by the controller, and that controls translational motion of the base based on inclination of the base detected by the inclination sensor.

10 Claims, 18 Drawing Sheets

ELECTRIC VEHICLE

The present application claims priority from Japanese Patent Application No. 2009-219761 filed on Sep. 24, 2009, the contents of which are incorporated herein by reference.

BACKGROUND OF THE INVENTION

1. Field of the Invention

The present invention relates to an electric vehicle.

2. Description of the Related Art

A small size electric vehicle including a structure that is adapted for low-speed running has been conventionally used to facilitate use by the elderly, disabled persons or the like.

An example of this type of electric vehicle is a four-wheeled electric vehicle 200 shown in FIG. 22 (for example refer to Japanese Unexamined Patent Application, first publication No. 2006-102387). A driving unit of the electric vehicle 200 drives and rotates rear wheels 203. The vehicle body 201 is driven (running) forward or backward by the rotation of the rear wheels 203. The vehicle body 201 is turned by varying the direction of the front wheel 202 by operating a steering unit 205.

The electric vehicle 200 can be driven forward or backward, and also can be turned to the right or left while being driven forward or backward. However the electric vehicle 200 cannot be driven directly to the side.

It is an exemplary object of an exemplary embodiment of the present invention to solve the above problems, and to provide an electric vehicle which enables instructions for being driven directly to the side while using an interface of a conventional operation system.

SUMMARY

An electric vehicle according to an aspect comprises a base; a movement operator that has at least one omnidirectional drive wheel which can be driven omnidirectionally; a seat member that is mounted on the base; an acceleration and deceleration command unit that detects an acceleration and deceleration command; a turning command unit that detects a turning command; an inclination detection unit that detects an inclination of the base; and a control unit that controls acceleration and deceleration of the base based on the acceleration and deceleration command detected by the acceleration and deceleration command unit, that controls turning of the base based on the turning command detected by the turning command unit, and that controls translational motion of the base based on the inclination of the base detected by the inclination detection unit.

In this manner, the acceleration and deceleration command unit can detect an acceleration and deceleration command, the turning command unit can detect a turning command and the inclination detection unit can detect an inclination of the base. The control unit can control acceleration and deceleration of the base based on an acceleration and deceleration command detected by the acceleration and deceleration command detection unit, can control turning of the base based on a turning command detected by the turning command unit, and can control translational motion of the base based on an inclination of the base detected by the inclination detection unit.

In the electric vehicle according to other aspects, the control unit controls the turning of the base so that incline the base during the turning. In this manner, the electric vehicle can move during turning with the base inclined.

The electric vehicle according to another aspect may comprise a rotation center position determination unit that determines a position of the rotation center during turning at least according to a velocity of the base or an acceleration of the base. In this manner, the electric vehicle can turn about the position of a rotation center according to a velocity or acceleration.

The electric vehicle according to another aspect comprise a base; a first omnidirectional drive wheel that is mounted on the base and can be driven omnidirectionally; a second omnidirectional drive wheel that is mounted on the base so that a symmetry axis thereof is parallel with a symmetry axis of the first omnidirectional drive wheel; a seat member that is mounted so that a straight line connecting a wheel center of the first omnidirectional drive wheel and a wheel center of the second omnidirectional drive wheel specifies a fore-and-aft direction; an acceleration and deceleration command unit that detects an acceleration and deceleration command; a turning command unit that detects a turning command; an inclination detection unit that detects inclination of the base; and a control unit that controls acceleration and deceleration of the base based on the acceleration and deceleration command detected by the acceleration and deceleration command unit, that controls turning of the base based on the turning command detected by the turning command unit, and that controls translational motion of the base based on inclination of the base detected by the inclination detection unit.

In this manner, the acceleration and deceleration command unit can detect an acceleration and deceleration command, the turning command unit can detect a turning command and the inclination detection unit can detect an inclination of the base. The control unit can control acceleration and deceleration of the base based on an acceleration and deceleration command detected by the acceleration and deceleration command detection unit, can control turning of the base based on a turning command detected by the turning command unit, and can control translational motion of the base based on an inclination of the base detected by the inclination detection unit.

In the electric vehicle according to another aspect, the straight line above may be parallel to a fore-and-aft direction of the seat member.

In this manner, the electric vehicle can move in a fore-and-aft direction of the seat member along a direction of the straight line connecting the center of the wheels.

TECHNICAL EFFECTS

According to the aspects as described above, the acceleration and deceleration command unit can detect an acceleration and deceleration command, the turning command unit can detect a turning command and the inclination detection unit can detect an inclination of the base. The control unit can control acceleration and deceleration of the base based on an acceleration and deceleration command detected by the acceleration and deceleration command detection unit, can control turning of the base based on a turning command detected by the turning command unit, and can control translational motion of the base based on an inclination of the base detected by the inclination detection unit. In this manner, the electric vehicle is enabled for translational motion according to an inclination of the base in addition to acceleration and deceleration according to an acceleration and deceleration command or turning according to a turning command.

According to the aspects as described above, since the base is inclined during turning, stable riding comfort is also enabled during turning.

According to the aspects as described above, natural turning is enabled by turning about the rotation center position according to the velocity or the acceleration.

According to the aspects as described above, the fore-and-aft direction of the seat member is parallel to a straight line connecting the wheel center of the first omnidirectional drive wheel and the wheel center of the second omnidirectional drive wheel. In this manner riding comfort can be improved.

DETAILED DESCRIPTION OF THE PREFERRED EMBODIMENTS

Exemplary embodiments of the present invention will be described hereafter with reference to the attached figures.

Figure 1:
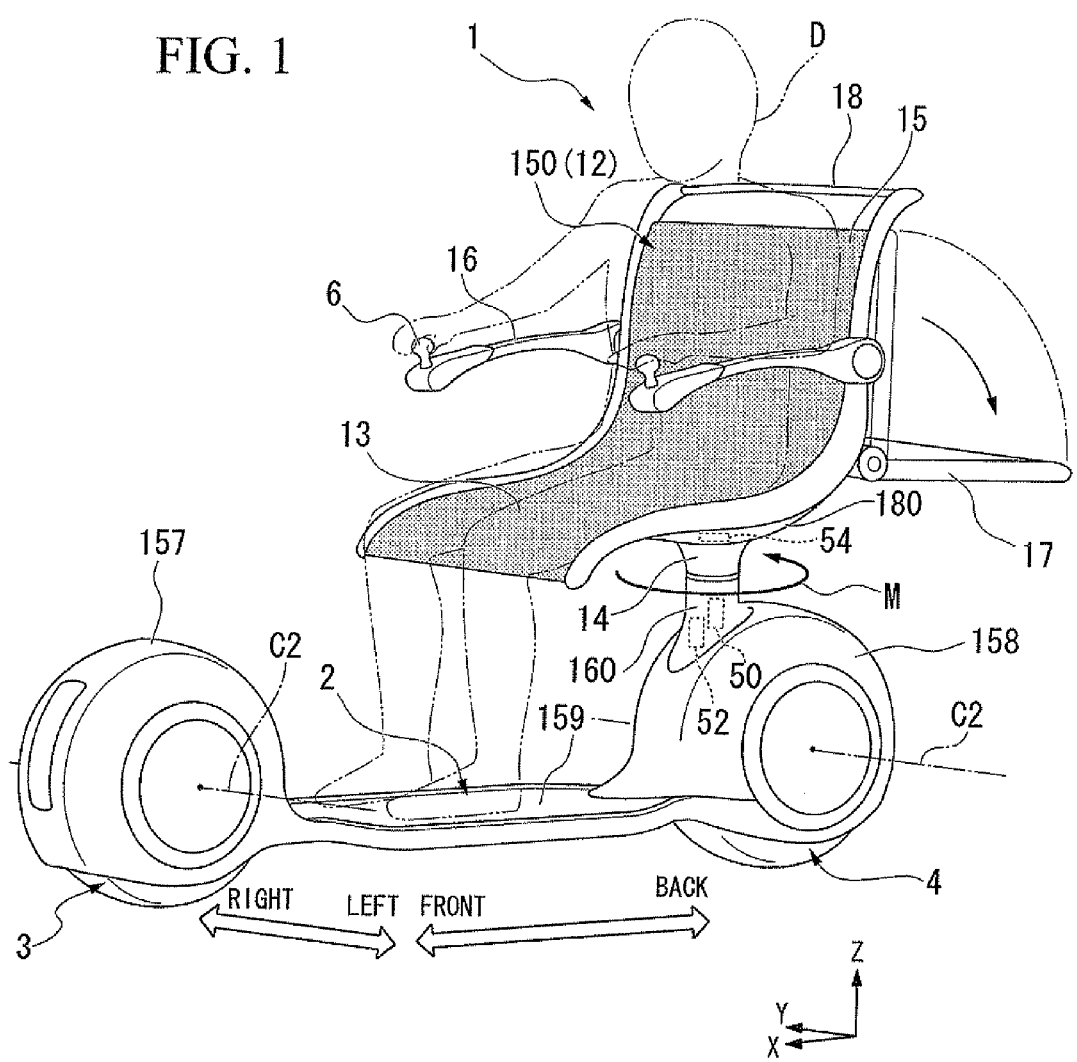
FIG. 1 is a perspective view seen from the front side of an electric vehicle of an exemplary embodiment.
Figure 2:
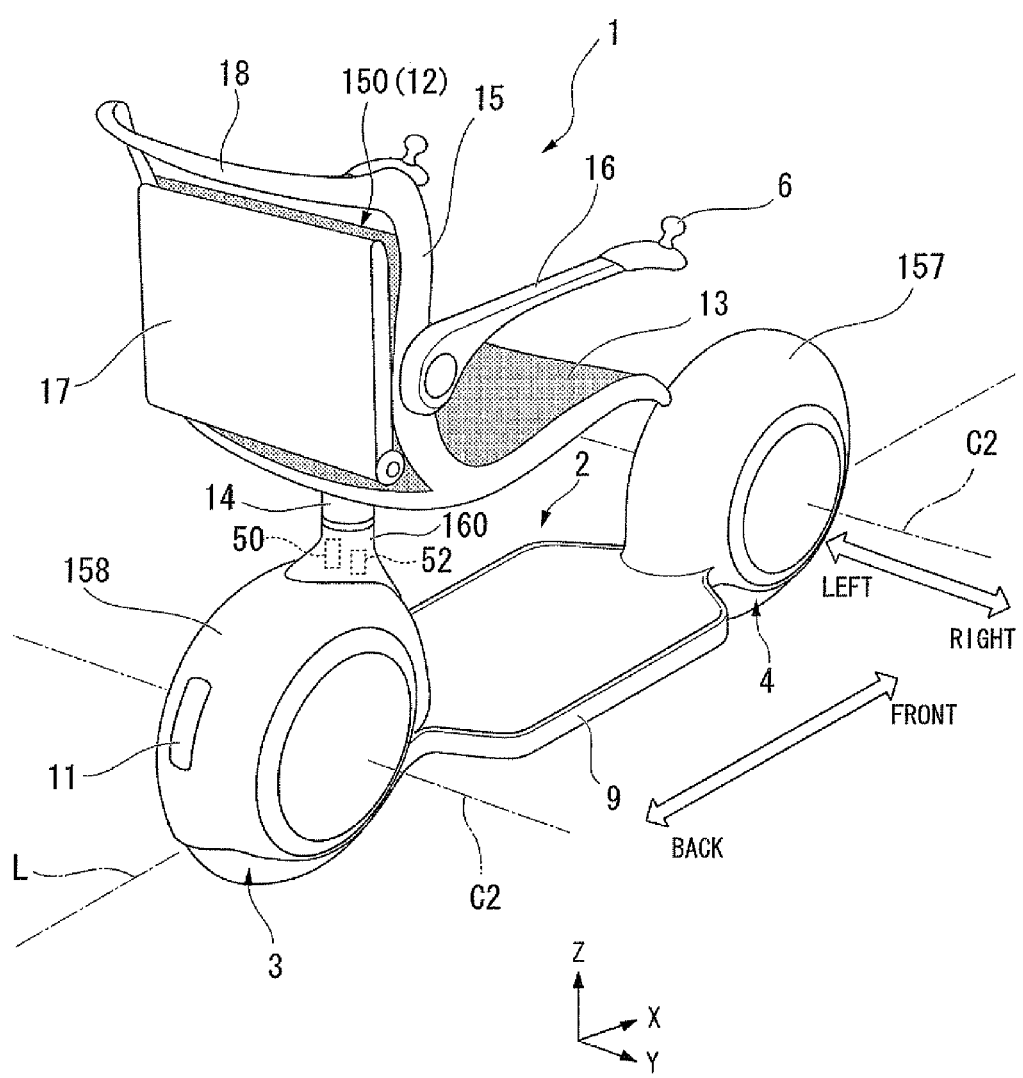
FIG. 2 is a perspective view seen from the rear side of an electric vehicle of the exemplary embodiment.

FIG. 1 is a perspective view seen from the front side of an electric vehicle. FIG. 2 is a perspective view seen from the rear side of the electric vehicle.

As shown in FIG. 1 and FIG. 2, the electric vehicle 1 of the exemplary embodiment comprises a vehicle body 2 (base), a front wheel 3 (first omnidirectional drive wheel) and a rear wheel 4 (second omnidirectional drive wheel), and a seat member 150 enabling seating by a driver (user) D in a forward direction of the electric vehicle 1. Both the front wheel 3 and the rear wheel 4 are an omnidirectional vehicle, and are mounted in a front and a rear side of the vehicle body 2. The seat member 150 is disposed above the rear wheel 4.

The vehicle body 2 comprises a step floor 159, a front wheel fender 157 and a rear wheel fender 158, and connecting portion 160. The step floor 159 forms a bridge between the front wheel 2 and the rear wheel 4. The front wheel fender 157 and the rear wheel fender 158 configure the front wheel 3 and the rear wheel 4. The connecting portion 160 connects the rear wheel fender 158 and the seat member 150.

The step floor 159 is a flat plate shape member that extends parallel to the road surface T (FIG. 3) and maintains an interval with the road surface T. The foot of the driver D, luggage, or the like can be loaded onto the upper surface of the step floor 159. The front wheel fender 157 of the front wheel 3 is connected to a front end portion of the step floor 159. The rear wheel fender 158 of the rear wheel 4 is connected to a rear end portion of the step floor 159.

The connecting portion 160 is a cylindrical member that is extended upwards. The lower end of the connecting portion 160 is connected to an upper portion of the rear wheel fender 158. The seat member 150 is connected to the upper end of the connecting portion 160.

The seat member 150 comprises an L-shaped seat portion 12 when viewed sideward for enabling a driver D to ride thereon, and a base portion 180 connecting the seat portion 12 and the connecting portion 160 described above. The seat portion 12 comprises a seat surface portion 13 and a seat back 15. The seat surface portion 13 extends in a fore-and-aft direction (horizontal direction) to thereby support the buttocks and femoral region of the driver D. The seat back 15 extends upwardly from the rear end of the seat surface portion 13 and supports the back of the driver D. In the following description, the seat portion is used for the same meaning as the seat member some times, unless specified explanations are given.

A pair of arm rests 16 extending forward from an intermediate portion of the seat back 15 in a height direction is provided on both end portions on the right and left of the seat back 15. These arm rests 16 are supported to enable rotation about a pitch axis (axis orthogonal to the fore-and-aft direction) with respect to the seat back 15. A controller 6 is provided on the distal end of the arm rest 16 to enable manual steering of the moving operation of the electric vehicle 1 by the driver D. A railing 18 extending along the lateral direction (the direction of the arrow in the figure, the right and left direction when the driver D is seated) is provided on the upper end of the seat back 15. Luggage such as a bag can be fastened onto the railing 18. A retractable luggage carrier 17 is provided on a rear side of the seat back 15. The luggage carrier 17 is supported to enable inclination about a pitch axis on the lower end of the seat back 15. More specifically, the luggage carrier 17 is disposed to enable substantially parallel extension to the seat back 15 when not in use (refer to FIG. 2). On the other hand, when in use, the carrier 17 is inclined to a position that is substantially orthogonal to the seat back 15 (refer to FIG. 1) to thereby enable loading of luggage or the like onto an upper surface thereof.

The upper end of the base portion 180 is connected to a lower face of the seat surface portion 13. The lower end of the base portion 180 is connected to an upper end of the connecting portion though a driving unit (not shown). The seat member 150 can be rotated about the yawing axis (normal line of the road surface T (refer to FIG. 4) by the driving unit (refer to M in FIG. 1).

Figure 3:
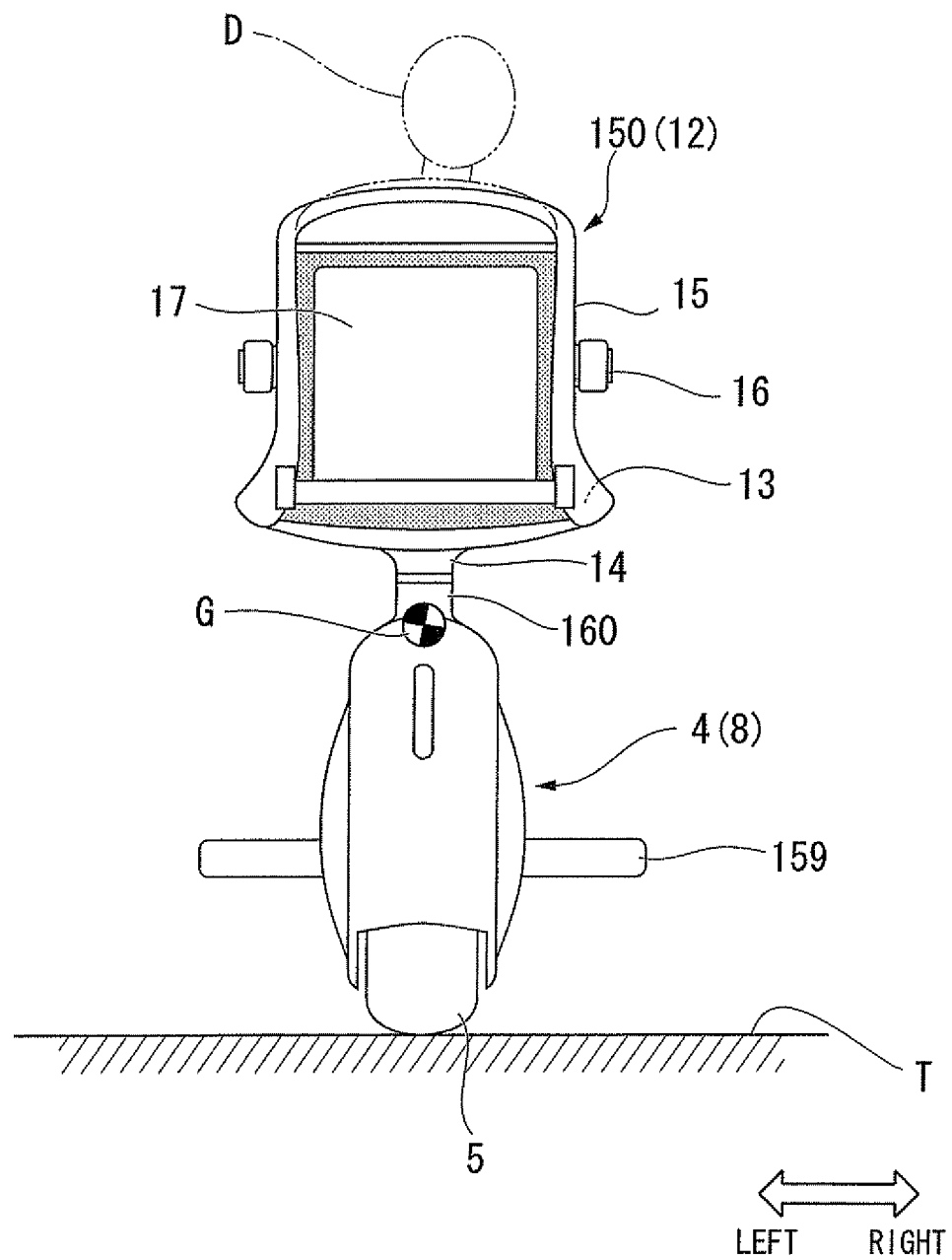
FIG. 3 is a back view seen from the rear side of an electric vehicle of the exemplary embodiment.

FIG. 3 is a back view seen from the rear side of the electric vehicle. Those aspects of configuration that are the same as FIG. 1 and FIG. 2 are denoted by the same reference numerals. The overall gravity center G (center-of-gravity point) combining the driver D and the electric vehicle 1 is shown in FIG. 3.

Figure 4:
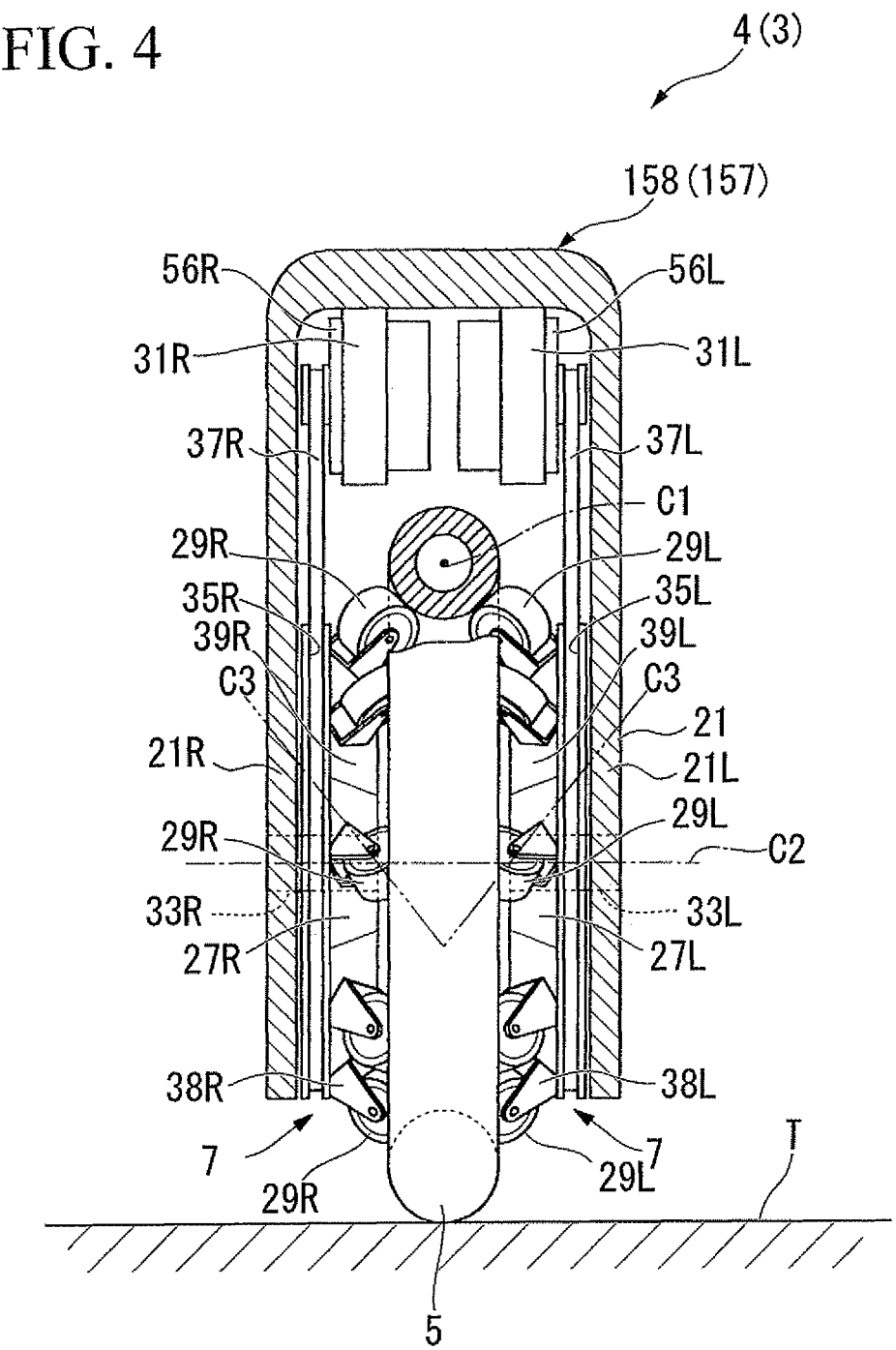
FIG. 4 is an enlarged sectional view of a rear wheel of the exemplary embodiment.
Figure 5:
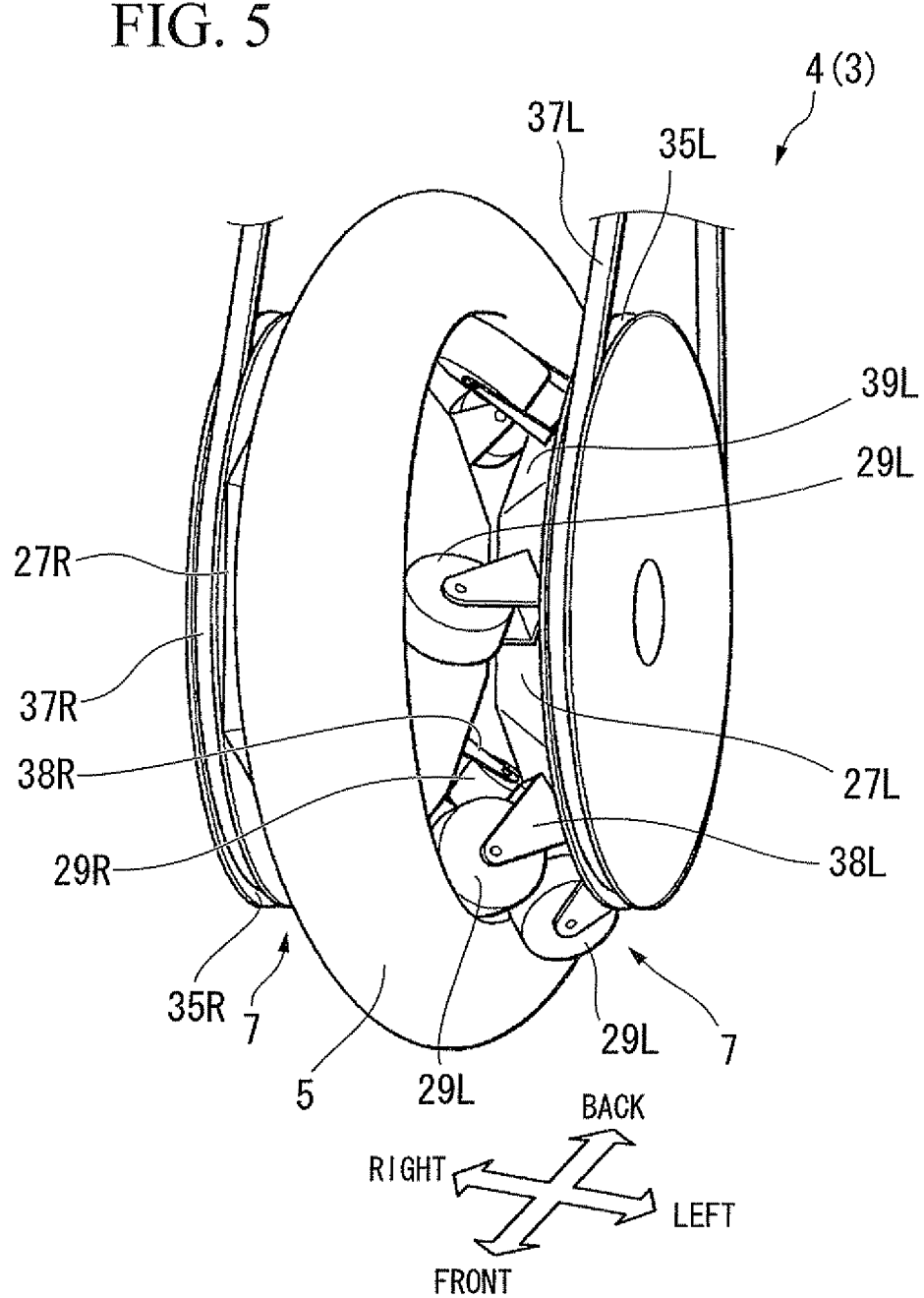
FIG. 5 is a perspective view of a rear wheel of the exemplary embodiment.
Figure 6:
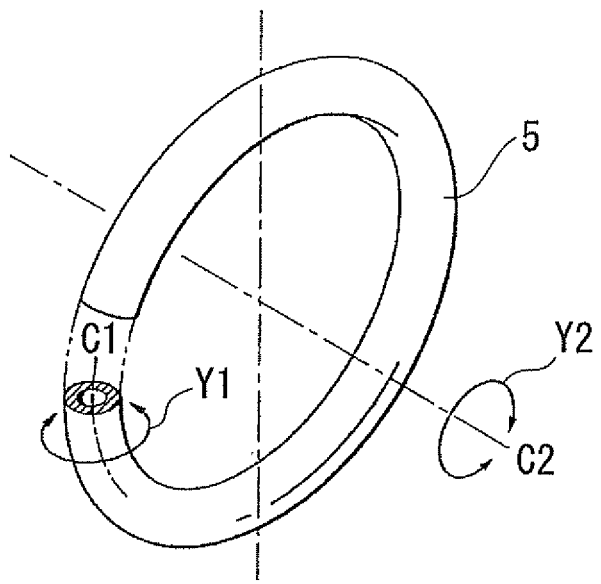
FIG. 6 is a perspective view of a main wheel of the exemplary embodiment.
Figure 7:
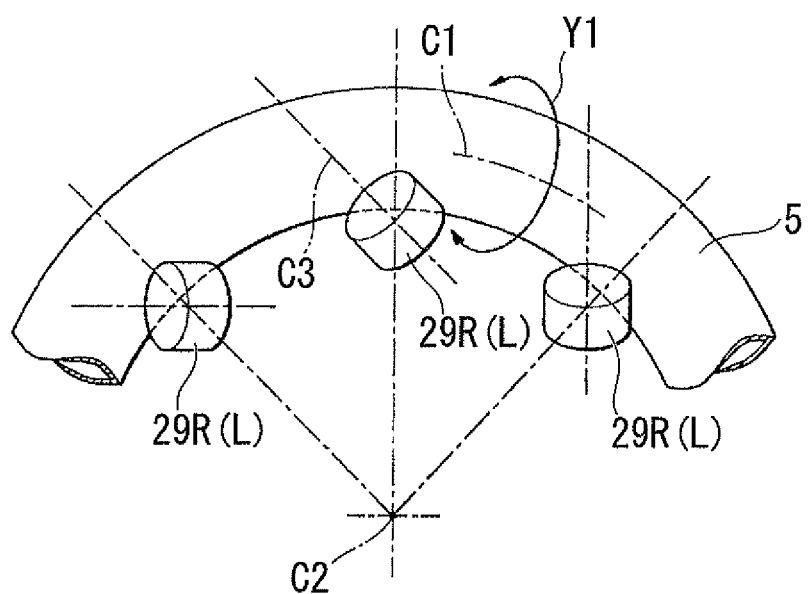
FIG. 7 is a view illustrating a positional relationship between the main wheel and a free roller in the exemplary embodiment.

FIG. 4 is an enlarged sectional view of the rear wheel. FIG. 5 is a perspective view of the rear wheel. FIG. 6 is a perspective view of a main wheel. FIG. 7 illustrates the positional relationship between the main wheel and a free roller. Since the front wheel and the rear wheel have the same configuration, the following description will use the rear wheel for the purposes of example. Furthermore FIG. 4 only shows a portion of the main wheel and the rear wheel fender as a sectional view.

As shown by FIG. 4 through FIG. 7, the rear wheel 4 comprises a main wheel 5 formed as a circle from a rubber-based elastic material or the like. The main wheel 5 has a substantially circular transverse sectional shape. The elastic deformation of the main wheel 5 enables rotation of the main wheel 5 about the center C1 of the circular sectional face (more specifically, the circumference line passing through the circular sectional face center C1 and concentric with the center of the main wheel 5) as shown by Y1 in FIG. 6 and FIG. 7.

The main wheel 5 is disposed on an inner side of the rear wheel fender 158 in a state in which the axis C2 thereof coincides with the lateral direction of the electric vehicle 1 (the axis C2 orthogonal to the overall diametrical direction of the main wheel 5), and is placed in contact with the road surface T on a lower end of the outer peripheral face of the main wheel 5. The rear wheel fender 158 is a dome shaped member formed as a circle when viewed from the side, and opens downwardly to thereby cover the entire rear wheel 4 with the exception of the lower end.

The main wheel 5 can performs an operation (an operation of rotating on the road surface T) of rotating about the axis C2 of the main wheel 5 as shown by Y2 in FIG. 6 as a result of driving by an actuator 7 (described in detail hereafter) and an operation of rotating about the transverse sectional center C1 of the main wheel 5. As a result, the main wheel 5 can move in all directions (can perform omnidirectional movement) on the road surface T as a result of the composite operation of these rotating operations.

The actuator 7 comprises a rotation member 27R and a free roller 29R interposed between the main wheel 5 and the right wall 21R of the rear wheel fender 158, a rotation member 27L and a free roller 29L interposed between the main wheel 5 and the left wall 21L of the rear wheel fender 158, an electric motor 31R acting as an actuator disposed above the rotation member 27R and the free roller 29R, and an electric motor 31L acting as an actuator disposed above the rotation member 27L and the free roller 29L.

The respective housings of the electric motors 31R and 31L are respectively mounted on both side walls 21R, 21L of the rear wheel fender 158. Although this has been omitted from the figures, a power source (capacitor) for the electric motors 31R, 31L is mounted in a suitable position in the vehicle body 2.

The rotation member 27R is supported to rotate on the right side wall 21R by a support shaft 33R that has a transverse axis (shaft center in lateral direction). In the same manner, the rotation member 27L is supported to rotate on the left side wall 21L by a support shaft 33L that has a transverse axis. In this case, the rotation axis of the rotation member 27R (axis of the support shaft 33R) and the rotation axis of the rotation member 27L (axis of the support shaft 33L) are coaxial.

The rotation members 27R, 27L are connected to an output axis of the respective electric motors 31R, 31L through a drive force transmission unit that includes a function as a speed reducer. The rotation members 27R, 27L are driven and rotated by a drive force (torque) transmitted respectively from the electric motors 31R, 31L. Each drive force transmission unit has a pulley and belt configuration for example. In other words, as shown in FIG. 4, the rotation member 27R is connected to the output axis (output shaft) of the electric motor 31R through the pulley 35R and the belt 37R. In the same manner, the rotation member 27L is connected to the output axis of the electric motor 31L through the pulley 35L and the belt 37L.

The drive force transmission unit described above may be configured by a sprocket and link chain, or may be configured by a plurality of gears. Furthermore, for example, the electric motors 31R, 31L may be opposed to each rotation member 27R, 27L so that the respective output axes of the electric motors 31R, 31L are coaxial to the respective rotation members 27R, 27L to thereby connect the respective output axes of the electric motors 31R, 31L to the rotation members 27R, 27L through the speed reducer (planetary gear apparatus or the like).

Each rotation member 27R, 27L is formed in the same shape as a circular truncated cone that has a reduced diameter with respect to the main wheel 5 and in which an outer peripheral surface thereof forms a tapering outer peripheral surface 39R, 39L.

A plurality of free rollers 29R are arranged in equal intervals on a circumference that is concentric with the rotation member 27R on a periphery of the tapering outer peripheral surface 39R of the rotation member 27R. These free rollers 29R are respectively mounted on the tapering outer peripheral surface 39R through a bracket 41R, and are supported to rotate on the bracket 41R.

In the same manner, a plurality of free rollers 29L (same number as the free rollers 29R) are arranged in equal intervals on a circumference that is concentric with the rotation member 27L on a periphery of the tapering outer peripheral surface 39L of the rotation member 27L. These free rollers 29L are respectively mounted on a tapering outer peripheral surface 39L through a bracket 41L, and are supported to rotate on the bracket 41L.

The main wheel 5 is sandwiched by the free roller 29R near the rotation member 27R and the free roller 29L near the rotation member 27L, and is disposed concentrically to the rotation members 27R, 27L.

As shown in FIG. 7, the axes C3 of the free rollers 29R, 29L incline with respect to the axis C2 of the main wheel 5 and are disposed in an orientation which inclines with respect to the diametrical direction of the main wheel 5 (when the main wheel 5 is viewed from the direction of its axis C2, the direction of the diameter connecting the axis C2 with each free roller 29R, 29L). In this orientation, the respective outer peripheral surfaces of each free roller 29R, 29L are respectively pressed in contact in an inclining direction onto the inner peripheral face of the main wheel 5.

More generally, when the rotation member 27R is driven to rotate about the axis C2, the right side free roller 29R is pressed into contact with an inner peripheral face of the main wheel 5 in an orientation in which, on the contact face with the main wheel 5, a frictional force component in a direction about the axis C2 (frictional force component of a tangential direction with respect to the inner periphery of the main wheel 5) and a frictional force component in a direction about the transverse sectional center C1 of the main wheel 5 act on the main wheel 5. The same comments apply to the left side free roller 29L.

The front wheel 3 is configured in the same manner as the rear wheel 4 described above. The front wheel 3 and the rear wheel 4 are disposed so that the mutual axes (rotation axis) C2 of the main wheel 5 are parallel (refer to FIG. 1 and FIG. 2). When the rotation members 27R, 27L are rotated and driven at the same velocity in the same direction by the electric motors 31R, 31L of the front wheel 3 and the rear wheel 4, the main wheel 5 rotates about the axis C2 in the same direction as the rotation members 27R, 27L. In this manner, each main wheel 5 rotates in a forward or a backward (rearward) direction on the road surface T, and drives the overall electric vehicle 1 in a forward or a backward direction. In this case, the main wheel 5 does not rotate about its transverse sectional center C1.

For example, when the rotation members 27R, 27L are rotated at the same velocity in mutually opposed directions, each main wheel 5 rotates about its transverse sectional center C1. In this manner, each main wheel 5 moves with respect to the direction of the axis C2 (in other words, the lateral direction), and the overall electric vehicle 1 is driven (moves) in a lateral direction. In this case, the main wheel 5 does not rotate about its axis C2.

When the rotation members 27R, 27L are rotated in the same direction or in opposite directions at mutually different velocities (a speed including a direction), each main wheel 5 rotates about the axis C2 and at the same time rotates about the transverse sectional center C1.

At this time, the main wheel 5 is driven in an inclining direction with respect to the fore-and-aft direction and the lateral direction due to the composite action (synthetic action) of these rotation actions, and the overall electric vehicle 1 is driven (moves) in the same direction as the main wheel 5. The moving direction of the main wheel 5 varies depending on a difference in the rotation velocity including the rotation direction of the rotation members 27R, 27L (a rotation velocity vector having polarity defined by the rotation direction).

Since the movement of each main wheel 5 is executed as described above, the moving velocity and the moving direction of the electric vehicle 1 can be controlled by controlling the respective rotation velocities (including rotation direction) of the electric motors 31R, 31L, and consequently by controlling of the rotation velocity of the rotation members 27R, 27L.

Next, the configuration for controlling the operation of the electric vehicle 1 of the exemplary embodiment will be described. In the following description, as shown in FIG. 1 and FIG. 2, an XYZ coordinate system is imaged in which the horizontal axis in a fore-and-aft direction is the X axis, the horizontal axis in the lateral direction is the Y axis, and the vertical direction is the Z axis. The fore-and-aft direction and the lateral direction are respectively called the X axis direction and the Y axis direction sometimes.

In the present aspect, the electric vehicle 1 moves in the Y axis direction using the two methods of translational motion in which the front wheel 3 and the rear wheel 4 are driven in the same Y axis direction, and of turning in which the front wheel 3 and the rear wheel 4 are driven in opposite Y axis directions.

Figure 8:
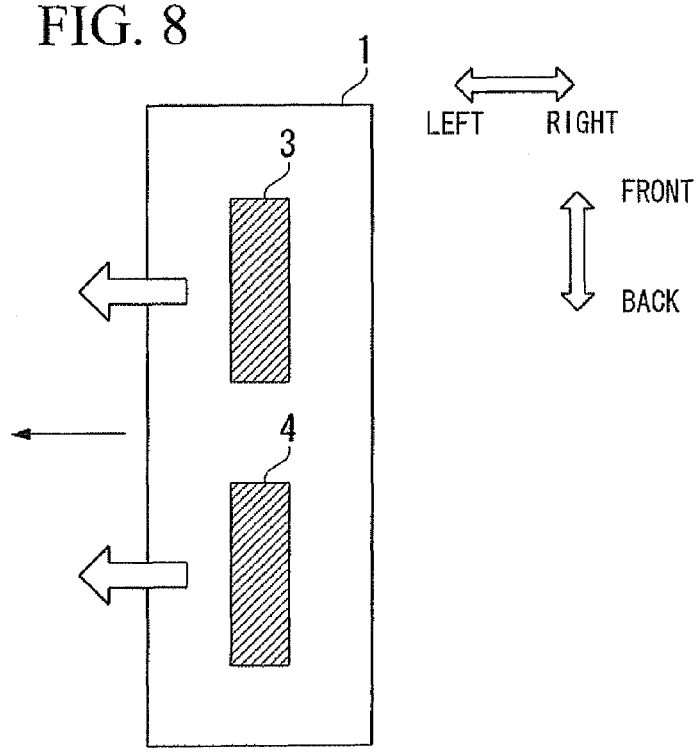
FIG. 8 is an upper view showing the driving directions of the front wheel and the rear wheel when the electric vehicle of the exemplary embodiment performs translational motion.
Figure 9:
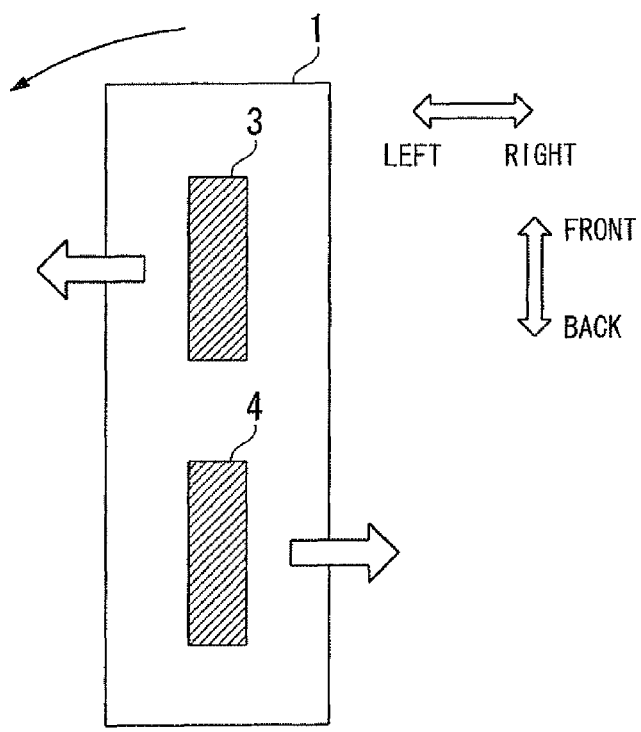
FIG. 9 is an upper view showing the driving directions of the front wheel and the rear wheel when the electric vehicle of an exemplary embodiment performs turning.

FIG. 8 is an upper view showing the driving direction of the front wheel 3 and the rear wheel 4 when an electric vehicle 1 performs translational motion. In the example shown in the figure, the front wheel 3 and the rear wheel 4 are driven in the same direction so that the electric vehicle 1 perform translational motion to the left. FIG. 9 is an upper view showing the driving direction of the front wheel 3 and the rear wheel 4 when an electric vehicle performs turning. In the example shown in the figure, the front wheel 3 and the rear wheel 4 are driven in mutually opposite directions so that the electric vehicle 1 is turned to the left.

Firstly, the schematic operational control of the electric vehicle 1 will be described. In the electric vehicle 1 according to the present embodiment, basically when the driver D seated in the seat portion 12 inclines the controller 6, a movement operation on the main wheels 5 is controlled so that the electric vehicle 1 is moved to the side to which the controller 6 is inclined. Furthermore, when the driver D does not operate the controller 6, and applies their body weight to the right or the left, the electric vehicle 1 undergoes translational motion towards the side to which the body weight is applied. These operations form a single basic steering operation in relation to the electric vehicle 1 (operation request for the electric vehicle 1), and the movement operation of the main wheels 5 is controlled through an actuator 7 in response to this steering operation.

More specifically, the electric vehicle 1 moves in response to the angle at which the controller 6 is inclined, or the angle of inclination of the electric vehicle 1 resulting from application of the body weight of the driver D to the right or the left when the controller 6 is not inclined. To prevent overturning of the electric vehicle 1, a target posture for the vehicle body 2 is configured as the posture when the gravity center G of the electric vehicle 1 (and the entire body of the driver D) is in a position substantially directly above the central point of the rear wheel 4 (more specifically, a state in which the gravity center G seen from the fore-and-aft direction of the electric vehicle 1 is in a position substantially directly above the contact point of the rear wheel 4 (the point on the road surface T at which the distance to the gravity center is the shortest)). More specifically, the front wheel 3 and the rear wheel 4 are controlled to make the actual posture of the vehicle body 2 converge on the target posture.

In other words, the movement operation of the front wheel 3 and the rear wheel 4 is controlled so that the vertical direction of the electric vehicle 1 coincides with the direction of gravity. More specifically, when it is determined that the gravity center G has moved in a lateral direction in relation to the target posture, each main wheel 5 is rotated about the center C1 to thereby move the electric vehicle 1 in a lateral direction. Alternatively, the posture of the vehicle body 2 is caused to converge on the target posture as a result of the composite operation of these rotation operations. Therefore when it is desired to make the electric vehicle 1 performs translational motion, the gravity center of the driver D inclines to the right or to the left. In this manner, the electric vehicle 1 moves to the left or the right in order to maintain the target posture. Furthermore when it is desired to make the electric vehicle 1 move forward and backward, or move to the right or the left while moving forward or backward, the driver D inclines the controller 6 in the direction in which the driver D wants to travel. Thus the electric vehicle 1 moves forward and backward, or moves to the right or the left while moving forward or backward in response to the inclination detected by the controller 6.

To perform the above operations, in the present embodiment, a control unit (control portion) 50 configured from an electric circuit unit including a drive circuit unit of the electric motor 31R, 31L or a microcomputer, a controller 6 that detects an instruction for a moving direction of the electric vehicle 1, an inclination sensor 52 that measures the inclination angle θb with respect to the direction of gravity of a predetermined position of the vehicle body 2 and its rate of change (=dθb/dt), a load sensor 54 that detects whether or not a driver D is ridden on the electric vehicle 1, and a rotary encoder 56R, 56L that is an angle sensor for detecting the rotation angle and the rotation angular velocity of the output axis of the respective electric motors 31R, 31L (refer to FIG. 4) are mounted in an appropriate position in the electric vehicle 1.

The control unit 50 and the inclination sensor 52 for example are mounted and housed in an inner portion of the vehicle body 2. The load sensor 54 is mounted inside the seat portion 13. Furthermore the rotary encoders 56R, 56L are respectively integrated with the electric motors 31R, 31L. The rotary encoders 56R, 56L may be respectively mounted on the rotation member 27R, 27L.

In further detail, the inclination sensor 52 is composed of an acceleration sensor and a rate sensor such as a gyro sensor (angular velocity sensor). Detection signals from these sensors are output to a control unit 50. The control unit 50 calculates a measured value of the inclination angle θb with respect to a vertical direction, and a measured value of the inclination angular velocity θbdot that is its rate of change (derivative value), at the mounting position of the inclination sensor 52 by executing a predetermined measurement calculation process (this is a known calculation process) based on the output of the acceleration sensor and the rate sensor of the inclination sensor 52.

The measured inclination angle θb (hereinafter, this may be referred to as the base inclination angle θb) is more particularly composed of a component θb_x about the Y axis (pitch direction) and a component θb_y about the X axis (roll direction). In the same manner, the measured inclination angular velocity θbdot (hereinafter, this may be referred to as the base inclination angular velocity θbdot) is similarly composed of a component θbdot_x about the Y axis (pitch direction) (=dθb_x/dt) and a component θbdot_y about the X axis (roll direction) (=dθb_y/dt).

In the description of the present embodiment, when a variable for the motion state amount or the like that includes a component for the respective directions of the X axis and the Y axis (or a direction about each axis) such as the base inclination angle θb, or a variable such as a coefficient related to the motion state amount, makes a distinction with respect to each such component by way of notation, the suffix "_x" or "_y" is added to the reference symbol for the variable.

The variables related to translational motion such as translational velocity or the like add the suffix "_x" to components for the X axis direction and add the suffix "_y" to components for the Y axis direction.

On the other hand, variables related to rotation motion such as angle or rotation velocity (angular velocity) or angular acceleration or the like add the suffix "_x" to components around the Y axis and add the suffix "_y" to components around the X axis in order to arrange the suffixes and the variables related to translational motion.

When notating the variable as a group including the component in the X axis direction (or the component around the Y axis) and the component in the Y axis direction (or the component around the X axis), the suffix "_xy" is added to the notation for the variable. For example, when expressing the base inclination angle θb as a group including the component θb_x around (about) the Y axis and the component θb_y around the X axis, the notation "base inclination angle θb_xy" is used.

The load sensor 54 is installed in the seat portion 13 to support a load resulting from the weight of the driver when the driver is seated on the seat portion 13, and outputs a detection signal corresponding to that load to the control unit 50. The control unit 50 determines whether or not a driver is ridden on the electric vehicle 1 based on the measured value of the load indicated by the output of the load sensor 54.

In substitution for the load sensor 54, for example, a switching-type sensor that is placed in the ON position when a driver is seated on the seat portion 13 can be used.

The rotary encoder 56R generates a pulse signal for each rotation through a predetermined angle of the output axis of the electric motor 31R and outputs the pulse signal to the control unit 50. The control unit 50 measures the rotation angle of the output axis of the electric motor 53R based on the pulse signal, and measures the rate of change of time (differential value) of the measured value of the rotation angle as the rotation angular velocity for the electric motor 53R. The same comments apply to the rotary encoder 56L of the electric motor 31L.

The control unit 50 determines a velocity command that is a target value of the respective rotation angular velocity of the electric motors 31R, 31L by executing a predetermined calculation process using each measured value above. The respective rotation angular velocities of the electric motors 31R, 31L are feedback controlled according to the velocity command.

The relationship between the rotation angular velocity of the output axis of the electric motor 31R and the rotation angular velocity of the rotation member 27R is proportional to the speed decrease ratio of a fixed value between the output axis and the rotation member 27R. In the description of the present embodiment, for the sake of convenience, the rotation angular velocity of the electric motor 31R means the rotation angular velocity of the rotation member 27R. In the same manner, the rotation angular velocity of the electric motor 31L means the rotation angular velocity of the rotation member 27L.

The control processing performed by the control unit 50 will be described in further detail hereafter.

Figure 10:
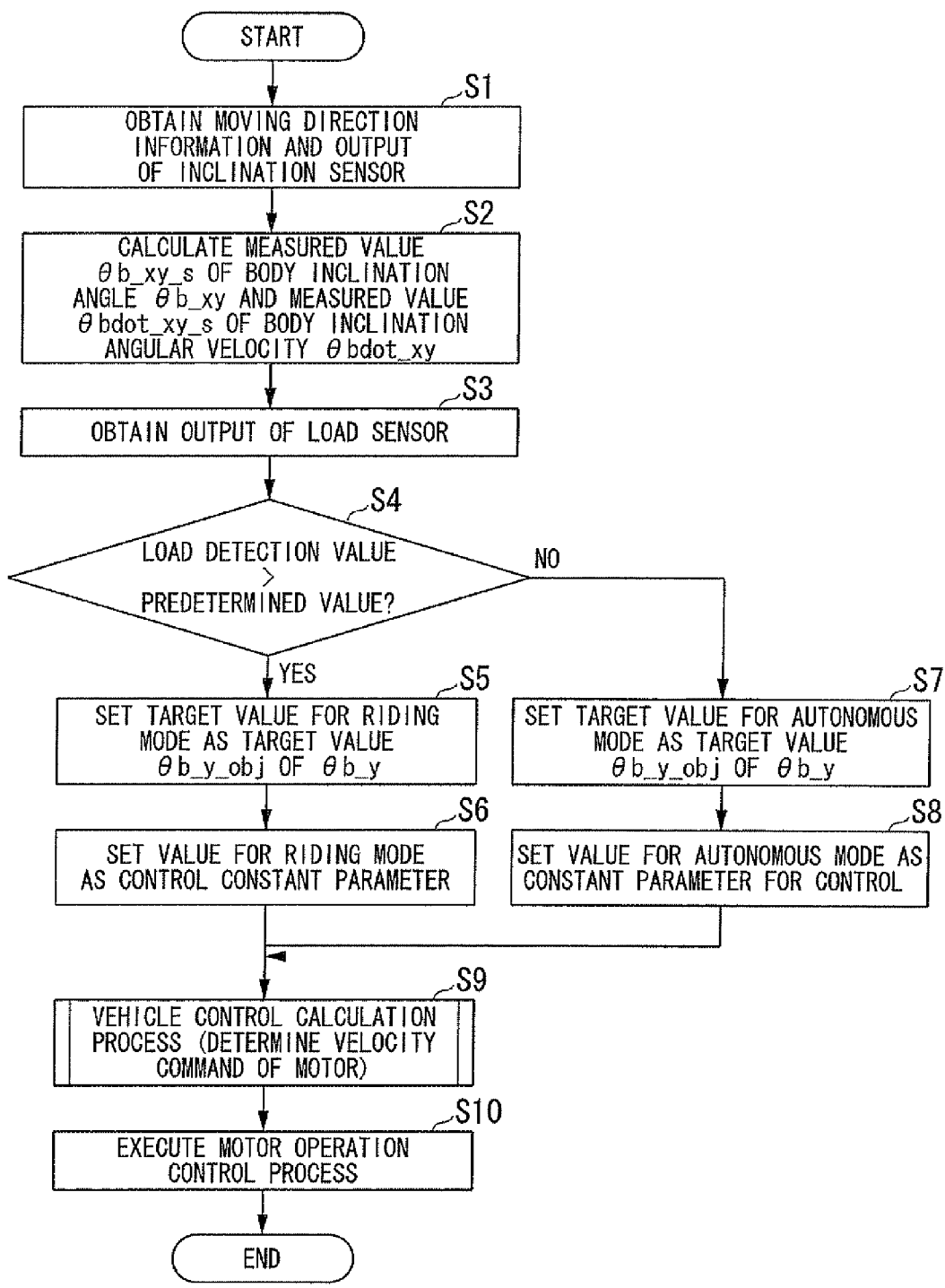
FIG. 10 is a flowchart showing a main routine process of a control unit according to the present aspect.

The control unit 50 executes process shown by the flowchart shown in FIG. 10 at a predetermined control processing cycle (main routine processing).

Firstly in a step S1, the control unit 50 obtains the output of the inclination sensor 52 and the moving direction information indicating the moving direction which is inputted into the controller 6.

Then the processing proceeds to step S2, and the control unit 50 calculates the measured value θb_xy_s for the base inclination angle θb and the measured value θbdot_xy_s for the base inclination angular velocity θbdot based on the obtained output of the inclination sensor 52.

However in the present embodiment, since the electric vehicle 1 is a two-wheeled vehicle, the following description will be simplified by making the measured value θb_x_s of the base inclination angle θb in the X direction take a value of 0 (θb_x_s=0), and the measured value θbdot_x_s of the base inclination angular velocity θbdot take a value of 0 (θbdot_x_s=0).

In the following description, when the actually observed value (the measured value or the estimated value) for a variable (state amount), such as the measured value θbdot_xy_s or the like, is denoted by a reference symbol, the suffix "_s" will be added to the reference symbol of the variable.

Next the control unit 50 in a step S3 obtains the output of the load sensor 54 and then executes a determination process in a step S4. In the determination process, the control unit 50 determines whether or not a driver is ridden on the electric vehicle 1 (whether or not a driver is seated on the seat portion 13) by determining whether or not the load measured value indicated by the obtained output of the load sensor 54 is greater than a predetermined value which is set in advance.

When the determination result of the step S4 is affirmative, the control unit 50 executes a process of setting a target value θb_xy_obj of the base inclination angle θb and a process of setting a constant parameter value (a base value for various types of gain or the like) for operational control of the electric vehicle 1. These processes are executed respectively in steps S5 and S6.

In the step S5, the control unit 50 sets a preset target value for riding mode (boarding mode) as a target value θb_y_obj for the base inclination angle θb in the Y axis direction.

As used herein, "riding mode" means the operational mode of the electric vehicle 1 when a driver is ridden on the electric vehicle 1. The target value θb_y_obj for the riding mode is preset (set in advance) to coincide with or substantially coincide with the measured value θb_y_s for the measured base inclination angle θb based on the output of the inclination sensor 52 with respect to a posture of the base 9 in which the overall gravity center of the driver seated on the seat portion 13 and the electric vehicle 1 (hereinafter referred to as the overall gravity center of the electric vehicle and the driver) is positioned substantially directly above the floor surface (ground contact surface) of the vehicle wheel 5.

Then in step S6, the control unit 50 sets a preset riding mode value as a constant parameter value for operational control of the electric vehicle 1. The constant parameter includes values such as hx, hy, Ki_a_x, Ki_b_x, Ki_a_y, Ki_b_y (i=1, 2, 3) and will be described below.

When the determination result in the step S4 is negative, the control unit 50 executes a process of setting the target value θb_y_obj of the base inclination angle θb_y in the Y axis direction and a process of setting a constant parameter value for operational control of the electric vehicle 1. These processes are executed respectively in steps S7 and S8.

In the step S7, the control unit 50 sets the preset target value for autonomous mode as the target value θb_y_obj of the inclination angle θb.

As used herein "autonomous mode" means an operational mode of the electric vehicle 1 in which a driver is not ridden on the electric vehicle 1. The target value θb_y_obj for autonomous mode is preset to coincide with or substantially coincide with the measured value θb_y_s for the measured base inclination angle θb based on the output of the inclination sensor 52 with respect to a posture of the base 9 in which the gravity center of the electric vehicle 1 alone (hereinafter referred to as the electric vehicle single gravity center) is positioned substantially directly above the floor surface of the vehicle wheel 5. The target value θb_y_obj for autonomous mode is generally different from the target value θb_y_obj for riding mode.

Then in a step S8, the control unit 50 sets the preset autonomous mode value as a constant parameter value for the operational mode of the electric vehicle 1. The constant parameter value for autonomous mode differs from the constant parameter for the riding mode.

The reason that the constant parameter values in riding mode and autonomous mode are different is that the response characteristics in the operation of the electric vehicle 1 with respect to the control input differ due to the height of the gravity center in the respective modes, or the overall masses, or the like is different.

In the processes in steps S4 to S8 above, a constant parameter value and a target value θb_y_obj for the base inclination angle θb_y are set respectively for both operational modes of riding mode and autonomous mode.

The processing in the steps S5 and S6, or the processing in the steps S7 and S8 are not required to be performed on each control processing cycle, and may be executed only when the determination result in the step S4 changes.

Furthermore in both riding mode and autonomous mode, both the target value of the component θbdot_x about the Y axis and the target value of the component θbdot_y about the X axis of the base inclination angular velocity θbdot take a value of "0". As a result, processing to set the target value of the base inclination angular velocity θbdot_xy is not required. In the present aspect, the electric vehicle 1 is a two-wheeled vehicle, and therefore to simplify the following description, the control unit 50 will be assumed not to execute control on the base inclination angular velocity θbdot about the Y axis. In other words, control is not executed to make the component θbdot_x about the Y axis of the base inclination angular velocity θbdot take a value of 0.

After executing the processing in the steps S5 and S6 or the processing in the steps S7 and S8, in the following step S9, the control unit 50 executes an electric vehicle control calculation process to determine the respective velocity commands for the electric motors 31R, 31L of the front wheel 3 and the rear wheel 4. The details of the electric vehicle control calculation process will be described hereafter. The electric vehicle 1 in the present embodiment as described above is a two-wheeled vehicle. Therefore in order to simplify the following description, inclination components in the X direction will be ignored. In other words, in the following description, the measured value θb_x_s for the base inclination angle θb and the measured value θbdot_x_s for the base inclination angular velocity θbdot both take a value of 0 (θb_x_s=0 and θbdot_x_s=0).

Next, the processing proceeds to a step S10 and the control unit 50 executes an operational control process of the electric motors 31R, 31L for the front wheel 3 and the rear wheel 4 in response to the velocity command determined in the step S9. In this operation control process, the control unit 50 determines a target value (target torque) for the output torque of the electric motor 31R so that the deviation of the velocity command for the electric motor 31R determined in the step S9 and the measured value of the rotation velocity of the electric motor 31R measured based on the output of the rotary encoder 56R converges to "0" according to this deviation. The control unit 50 controls the current applied to the electric motor 31R so that the output torque is outputted for the target torque by the electric motor 31R. The operational control of the left electric motor 31L is the same.

The above description describes the overall control processing executed by the control unit 50.

Next, the electric vehicle control calculation processing executed in the step S9 will be described in further detail.

In the following description, when the control for the front wheel 3 is the same as the control for the rear wheel 4, the description will proceed without making a particular distinction.

In the following description, the term "gravity center of the electric vehicle system" will be used to refer globally to the overall gravity center of the electric vehicle and the driver in riding mode and to the electric vehicle single gravity center in autonomous mode. When the operational mode of the electric vehicle 1 is riding mode, the gravity center of the electric vehicle system means the overall gravity center of the electric vehicle and the driver, and when the operational mode is autonomous mode, the gravity center of the electric vehicle system means the electric vehicle single gravity center.

In the following description, a value determined in each control processing cycle by the control unit 50 (updated value) is referred to as the current value when determined on the current (most recent) control processing cycle, and is referred to as the previous value when determined on the immediately previous control processing cycle. A value which is not particularly specified as a current value or a previous value means a current value.

The velocity and acceleration in the X axis direction is in a positive direction when oriented in a forward direction. The velocity and acceleration in the Y axis direction is in a positive direction when in a left direction.

Figure 11:
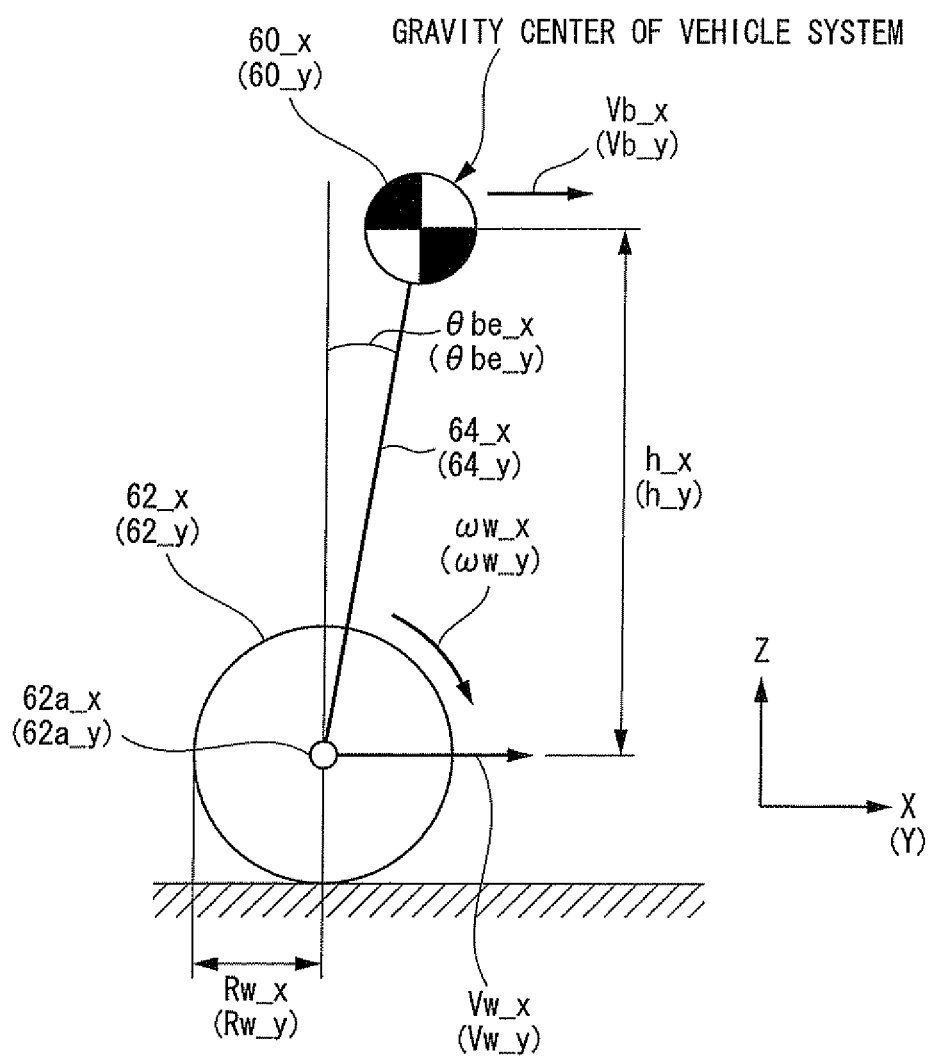
FIG. 11 is a schematic view showing an inverted-pendulum model expressing the dynamic behavior of the electric vehicle of the exemplary embodiment.

In the present embodiment, the electric vehicle control calculation process is executed in the step S9 on the basis of the dynamic behavior of the gravity center of the electric vehicle system (more particularly, the behavior when projected from a Y axis direction onto a plane (XZ plane) that is orthogonal thereto and the behavior when projected from an X axis direction onto a plane (YZ plane) that is orthogonal thereto) expressed by the behavior of an inverted pendulum model (dynamic behavior of an inverted pendulum) as approximately shown in FIG. 11.

Then as shown in FIG. 11, a reference symbol not enclosed in brackets is a reference symbol corresponding to the inverted pendulum model seen from the Y axis direction. A reference symbol enclosed in brackets is a reference symbol corresponding to the inverted pendulum model seen from the X axis direction.

The inverted pendulum model expressing the behavior seen from the Y axis direction includes a mass point 60_x that is positioned at the gravity center of the electric vehicle system and a virtual (fictitious) vehicle wheel 62_x (hereafter referred to as a virtual wheel 62_x) that turns freely on the surface and has a rotation axis 62a_x that is parallel to the Y axis direction. The mass point 60_x is supported by a linear rod 64_x on the rotation axis 62a_x of the virtual wheel 62_x, and freely swings about the rotation axis 62a_x with the rotation axis 62a_x as a supporting point.

In the inverted pendulum model, the motion of the mass point 60_x corresponds to motion of the gravity center of the electric vehicle system seen from the Y axis direction. Furthermore the inclination angle θbe_x of the rod 64_x corresponding to the vertical direction coincides with the deviation θbe_x_s (=θb_x_s−θb_x_obj) between the base inclination angle measured value θb_x_s about the Y axis and the base inclination angle target value θb_x_obj about the Y axis. The rate of change (=dθbe_x/dt) of the inclination angle θbe_x of the rod 64_x coincides with the base inclination angular velocity measured value θbdot_x_s about the Y axis. Furthermore the moving velocity Vw_x of the virtual wheel 62_x (the translational motion moving velocity in the X axis direction) coincides with the moving velocity in the X axis direction of the vehicle wheel 5 of the electric vehicle 1.

In the same manner, the inverted pendulum model that expresses the behavior seen from the X axis direction (refer to the symbols in the brackets in FIG. 11) includes the mass point 60_y positioned on the gravity center of the electric vehicle system and a virtual vehicle wheel 62_y (hereafter referred to as a virtual wheel 62_y) that turns freely on the surface and has a rotation axis 62a_y that is parallel to the X axis direction. The mass point 60_y is supported by a linear rod 64_y on the rotation axis 62a_y of the virtual wheel 62_y, and freely oscillates about the rotation axis 62a_y with the rotation axis 62a_y as a supporting point.

In this inverted pendulum model, the motion of the mass point 60_y corresponds to the motion of the gravity center of the electric vehicle system seen from the X axis direction. Furthermore the inclination angle θbe_y of the rod 64_y corresponding to the vertical direction coincides with the deviation θbe_y_s (=θb_y_s−θb_y_obj) between the base inclination angle measured value θb_y_s about the X axis and the base inclination angle target value θb_y_obj about the X axis. The rate of change (=dθbe_y/dt) of the inclination angle θbe_y of the rod 64_y coincides with the base inclination angular velocity measured value θbdot_y_s about the X axis. The moving velocity Vw_y of the virtual wheel 62_y (the translational motion moving velocity in the Y axis direction) coincides with the moving velocity in the Y axis direction of the vehicle wheel 5 of the electric vehicle 1.

The virtual wheels 62_x, 62_y respectively have a radius of a predetermined value Rw_x, Rw_y which is set in advance.

The relation shown in the following equation (01a), (01b) is established with respect to the respective rotation angular velocities ωw_x, ωw_y of the virtual wheels 62_x, 62_y and the respective rotation angular velocities ω_R, ω_L of the electric motors 31R, 31L (more accurately, the respective rotation angular velocities ω_R, ω_L of the rotation members 27R, 27L).

$$\omega w\_x = (\omega\_R + \omega\_L)/2 \qquad \text{Equation (01a)}$$

$$\omega w\_y = C \cdot (\omega\_R - \omega\_L)/2 \qquad \text{Equation (01b)}$$

"C" in Equation (01b) is a coefficient having a predetermined value that depends on slip or on a mechanical relationship between the free roller 29R, 29L and the vehicle wheel 5.

The dynamics of the inverted pendulum model shown in FIG. 11 are expressed by the following equations (03x), (03y). The equation (03x) is an equation expressing the dynamics of the inverted pendulum model seen from the Y axis direction and the equation (03y) is an equation expressing the dynamics of the inverted pendulum model seen from the X axis direction.

$$d^2\theta be\_x/dt^2 = \alpha\_x \cdot \theta be\_x + \beta\_x \cdot \omega wdot\_x \qquad \text{Equation (03x)}$$

$$d^2\theta be\_y/dt^2 = \alpha\_y \cdot \theta be\_y + \beta\_y \cdot \omega wdot\_y \qquad \text{Equation (03y)}$$

The term ωwdot_x in Equation (03x) is the rotation angular acceleration of the virtual wheel 62_x (the first derivative value of the rotation angular velocity ωw_x). The term α_x is a coefficient that depends on the mass of the mass point 60_x or the height h_x. The term β_x is a coefficient that depends on the inertia of the virtual wheel 62_x (inertial moment) or the radius Rw_x. The same comments apply to the terms ωwdot_y, α_y and β_y in Equation (03y).

As shown by Equations (03x) and (03y), the motion of the mass points 60_x, 60_y in the inverted pendulum (consequently the motion of the gravity center of the electric vehicle system) is respectively regulated depending on the rotation angular acceleration ωwdot_x of the virtual wheel 62_x and the rotation angular acceleration ωwdot_y of the virtual wheel 62_y.

In the present embodiment, the rotation angular acceleration ωwdot_x of the virtual wheel 62_x is used as an operation amount (control input) for controlling the motion of the gravity center of the electric vehicle system seen from the Y axis direction, and the rotation angular acceleration ωwdot_y of the virtual wheel 62_y is used as an operation amount (control input) for controlling the motion of the gravity center of the electric vehicle system seen from the X axis direction.

The electric vehicle control calculation process in step S9 will be schematically described hereafter. The control unit 50 determines a virtual wheel rotation angular acceleration command ωwdot_x_cmd, ωwdot_y_cmd that is the command value (target value) for the rotation angular acceleration ωwdot_x, ωwdot_y as an operational amount so that the motion of the mass point 60_x seen from the X axis direction and the motion of the mass point 60_y seen from the Y axis direction corresponds to a desired motion of the gravity center of the electric vehicle system. Furthermore the control unit 50 determines a value obtained by respectively integrating the virtual wheel rotation angular acceleration commands ωwdot_x_cmd, ωwdot_y_cmd, as the virtual wheel rotation angular velocity command ωw_x_cmd, ωw_y_cmd that is a command value (target value) of the respective rotation angular velocities ωw_x, ωw_y of the virtual wheels 62_x, 62_y.

The control unit 50 uses the moving velocity (=Rw_x·ωw_x_cmd) of the virtual wheel 62_x corresponding to the virtual wheel rotation angular velocity command ωw_x_cmd and the moving velocity (=Rw_y·ωw_y_cmd) of the virtual wheel 62_y corresponding to the virtual wheel rotation angular velocity command ωw_y_cmd respectively as a target moving velocity in the X axis direction and a target moving velocity in the Y axis direction of the vehicle wheel 5 of the electric vehicle 1. The control unit 50 determines respective velocity commands ω_R_cmd, ω_L_cmd of the electric motors 31R, 31L in order to realize these respective target moving velocities.

In the present embodiment, the virtual wheel rotation angular acceleration commands ωwdot_x_cmd, ωwdot_y_cmd that act as operational amounts (control inputs) are determined by adding three operational amount components as shown in Equations (07x), (07y) as described hereafter.

Figure 12:
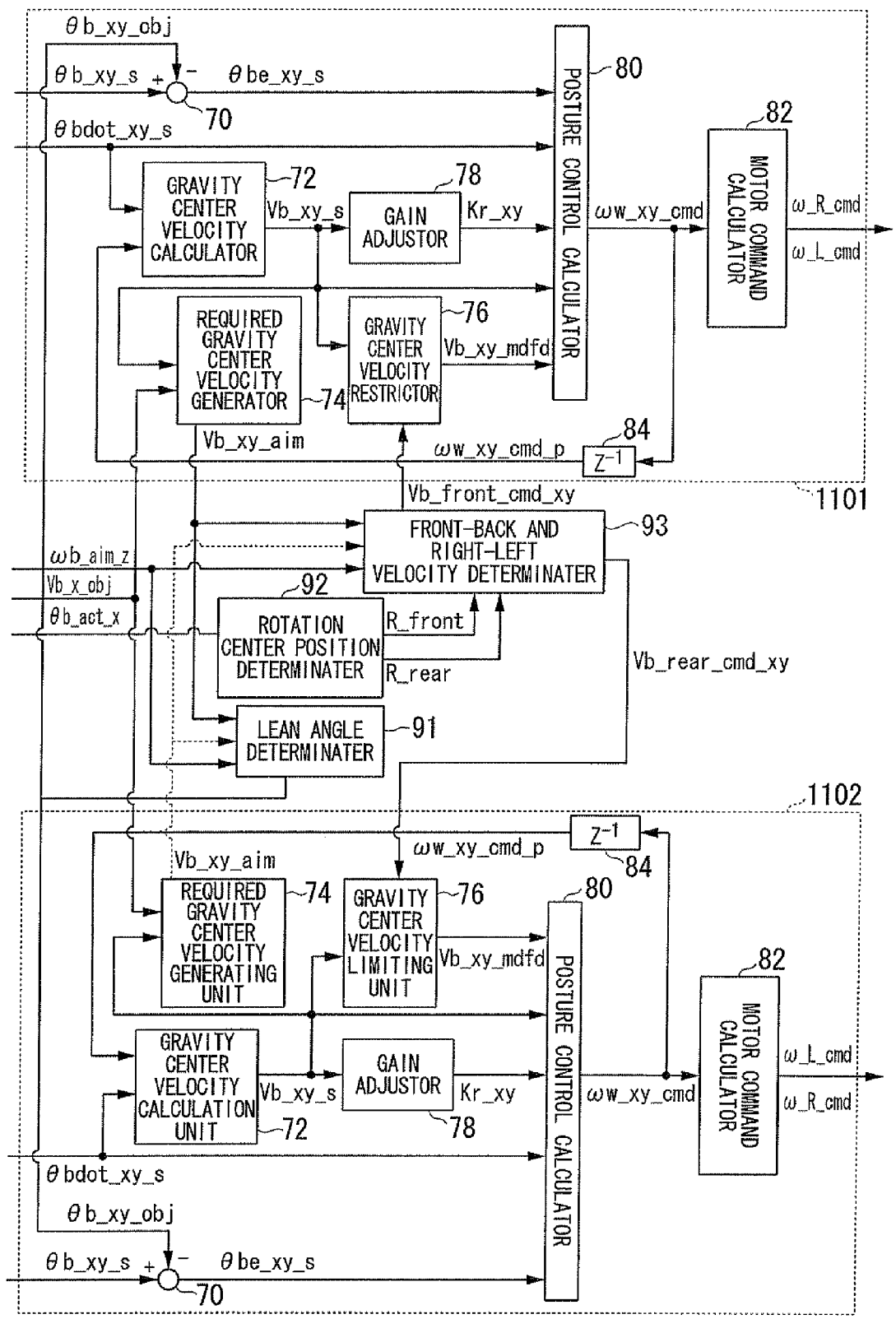
FIG. 12 is a functional block diagram of a control unit of the exemplary embodiment.

The control unit 50 has the function shown in the block diagram in FIG. 12 as the function for executing the electric vehicle control calculation process in step S9. In the example shown in FIG. 12, the control unit 50 includes a front wheel control unit 1101 that controls the front wheel 3 and a rear wheel control unit 1102 that controls the rear wheel 4. The front wheel control unit 1101 and the rear wheel control unit 1102 perform the same operations and merely different with respect to input information.

In other words, the control unit 50 comprises a deviation calculator 70, a gravity center velocity calculator 72, a required gravity center velocity generator 74, a gravity center velocity restrictor 76, a gain adjustor 78, a lean angle determiner (lean angle determination unit) 91, a rotation center position determiner 92, and a front-back and right-left velocity command determiner 93.

The deviation calculator 70 calculates a base inclination angle deviation measured value θbe_xy_s that is the deviation between the base inclination angle measured value θb_xy_s and the base inclination angle target value θb_xy_obj. The gravity center velocity calculator 72 calculates the gravity center velocity estimated value Vb_xy_s as the observed value of the gravity center velocity Vb_xy that is the moving velocity of the gravity center of the electric vehicle system. The required gravity center velocity generator 74 generates a required gravity center velocity Vb_xy_aim as a required value of the gravity center velocity Vb_xy that is estimated to be required for a steering operation of the electric vehicle 1 (operations in which an impelling force is applied to the electric vehicle 1) by a driver or the like. The gravity center velocity restrictor 76 determines a control target gravity center velocity Vb_xy_mdfd as a target value of the gravity center velocity Vb_xy by using the gravity center velocity estimated value Vb_xy_s and the required gravity center velocity Vb_xy_aim to apply a limit corresponding to the permitted range of the rotation angular velocity of the electric motors 31R, 31L. The gain adjustor 78 determines a gain adjustment parameter Kr_xy to adjust a value of a gain coefficient of the Equations (07x), (07y) described below.

The control unit 50 further comprises a posture control calculator 80 that calculates a virtual wheel rotation angular velocity command ωw_xy_cmd, and a motor command calculator 82 that converts the virtual wheel rotation angular velocity command ωw_xy_cmd to a group containing a velocity command ω_R_cmd (command value of rotation angular velocity) of the right electric motor 31R and a velocity command ω_L_cmd (command value of rotation angular velocity) of the left electric motor 31L.

Reference symbol 84 in FIG. 12 denotes the delay element by which the virtual wheel rotation angular velocity command ωw_xy_cmd calculated by the posture control calculator 80 during each control process cycle is inputted. The delay element 84 outputs the previous value ωw_xy_cmd_p of the virtual wheel rotation angular velocity command ωw_xy_cmd during each control process cycle.

In the electric vehicle control calculation process in step S9, the processing in each of the processor described above will be described below.

More specifically, the control unit 50 executes the processing of the deviation calculator 70 and the processing of the gravity center velocity calculator 72.

A base inclination angle measured value θb_xy_s (θb_x_s and θb_y_s) calculated in the step S2 and a target value θb_xy_obj (θb_x_obj and θb_y_obj) set in the step S5 or the step S7 are inputted into the deviation calculator 70. The deviation calculator 70 calculates a base inclination angle deviation measured value θbe_x_s (=θb_x_s−θb_x_obj) about the Y axis by subtracting θb_x_obj from θb_x_s and calculates a base inclination angle deviation measured value θbe_y_s (=θb_y_s−θb_y_obj) about the X axis by subtracting θb_y_obj from θb_y_s.

The processing of the deviation calculator 70 may be executed before the electric vehicle control calculation process in the step S9. For example, the processing of the deviation calculator 70 may be executed during the processing of the step S5 or the step S7.

The current value of the base inclination angular velocity measured value θbdot_xy_s (θbdot_x_s and θbdot_y_s) calculated in the step S2 is inputted into the gravity center velocity calculator 72, and the previous value ωw_xy_cmd_p (ωw_x_cmd_p and ωw_y_cmd_p) of the virtual wheel velocity command ωw_xy_cmd is inputted from the delay element 84 into the gravity center velocity calculator 72. The gravity center velocity calculator 72 calculates a gravity center velocity estimated value Vb_xy_s (Vb_x_s and Vb_y_s) using a predetermined calculation equation based on the inverted pendulum model from these input values.

More specifically, the gravity center velocity calculator 72 respectively calculates Vb_x_s and Vb_y_s according to the following Equations (05x) and (05y).

$$Vb\_x\_s = Rw\_x \cdot \omega w\_x\_\text{cmd}\_p + h\_x \cdot \theta bdot\_x\_s \quad \text{Equation (05x)}$$

$$Vb\_y\_s = Rw\_y \cdot \omega w\_y\_\text{cmd}\_p + h\_y \cdot \theta bdot\_y\_s \quad \text{Equation (05y)}$$

In the Equations (05x) and (05y), Rw_x and Rw_y are the respective radii of the virtual wheels 62_x, 62_y as described above. These values are predetermined values which are set in advance. Furthermore h_x and h_y are the height of the mass point 60_x, 60_y of the respective inverted pendulum models. In the present embodiment, the height of the gravity center of the electric vehicle system is maintained to substantially a fixed value. Furthermore the values of h_x and h_y are respectively predetermined values which are set in advance. In addition, the height h_x and h_y are included in the constant parameter that sets the value in the step S6 and the step S8.

The first term on the right side of Equation (05x) is the moving velocity in the X axis direction of the virtual wheel 62_x corresponding to the previous value ωw_x_cmd_p of the velocity command of the virtual wheel 62_x. This moving velocity corresponds to the current value of the actual moving velocity in the X axis direction of the vehicle wheel 5. Furthermore the second term on the right side of Equation (05x) corresponds to the current value of the moving velocity in the X axis direction of the gravity center of the electric vehicle system (the relative moving velocity relative to the vehicle wheels 5) caused by the inclination at an inclination angular velocity of θbdot_x_s of the base 9 about the Y axis. The same comments apply to Equation (05y).

The group of the measured value (current values) of the respective rotation angular velocities of the electric motor 31R, 31L which are measured based on the output of the rotary encoder 56R, 56L is converted into the group of the respective rotation angular velocities of the virtual wheels 62_x, 62_y, and these rotation angular velocities may be used in substitution for ωw_x_cmd_p and ωw_y_cmd_p from Equation (05x), and (05y). However it may be advantageous to use the target values ωw_x_cmd_p and ωw_y_cmd_p in order to eliminate the effect of noise contained in the measured value of rotation angular velocity.

Next, the control unit 50 executes the processing of the required gravity center velocity generator 74 and the processing of the gain adjustor 78. In this case, a gravity center velocity estimated value Vb_xy_s (Vb_x_s and Vb_y_s) calculated at the gravity center velocity calculator 72 as described above is inputted into the required gravity center velocity generator 74 and the gain adjustor 78.

When the operational mode of the electric vehicle 1 is riding mode, the required gravity center velocity generator 74 determines the required gravity center velocity V_xy_aim (V_x_aim, V_y_aim) based on the inputted gravity center velocity estimated value Vb_xy_s (Vb_x_s and Vb_y_s) and the value according to the inclination that is detected by the controller 6, namely the velocity target value Vb_x_obj. The value of Vb_x_obj changes depending on the inclination detected by the controller 6. In this manner, the driver D can set the velocity of the electric vehicle 1 to an arbitrary velocity by operating the controller 6. In this embodiment, when the operational mode of the electric vehicle 1 is the autonomous mode, the required gravity center velocity generator 74 sets both the required gravity center velocities V_x_aim and V_y_aim to a value of 0.

The gain adjustor 78 determines the gain adjustment parameter Kr_xy (Kr_x and Kr_y) based on the inputted gravity center velocity estimated value Vb_xy_s (Vb_x_s and Vb_y_s).

The processing executed by the gain adjustor 78 will be described below making reference to FIG. 13 and FIG. 14.

Figure 13:
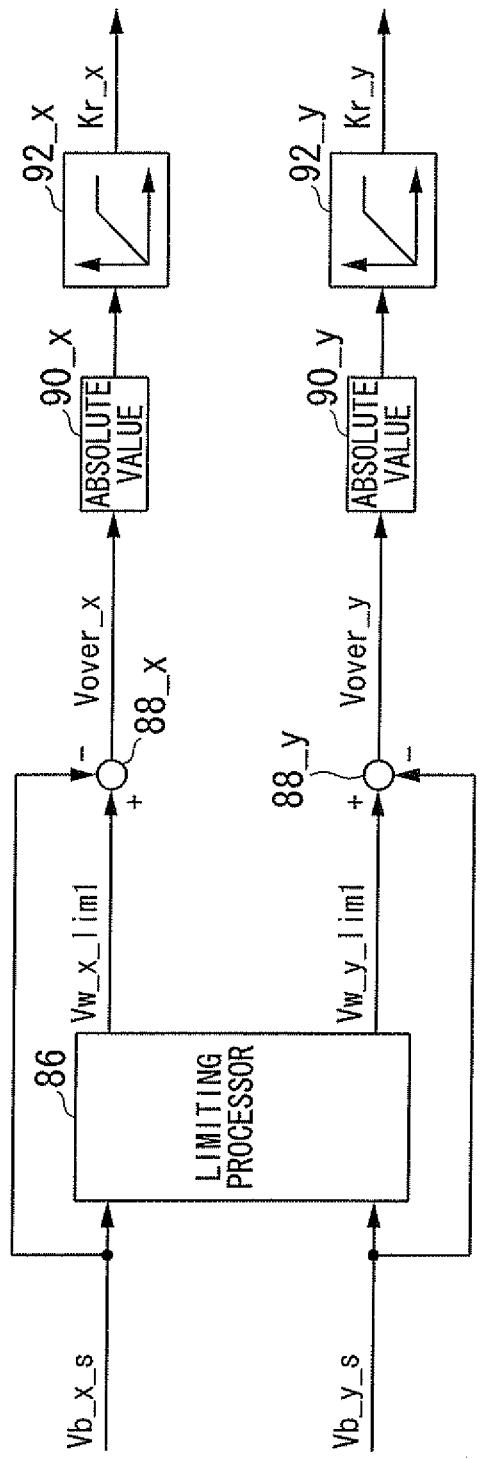
FIG. 13 is a functional block diagram of a gain adjustor of the exemplary embodiment.
Figure 14:
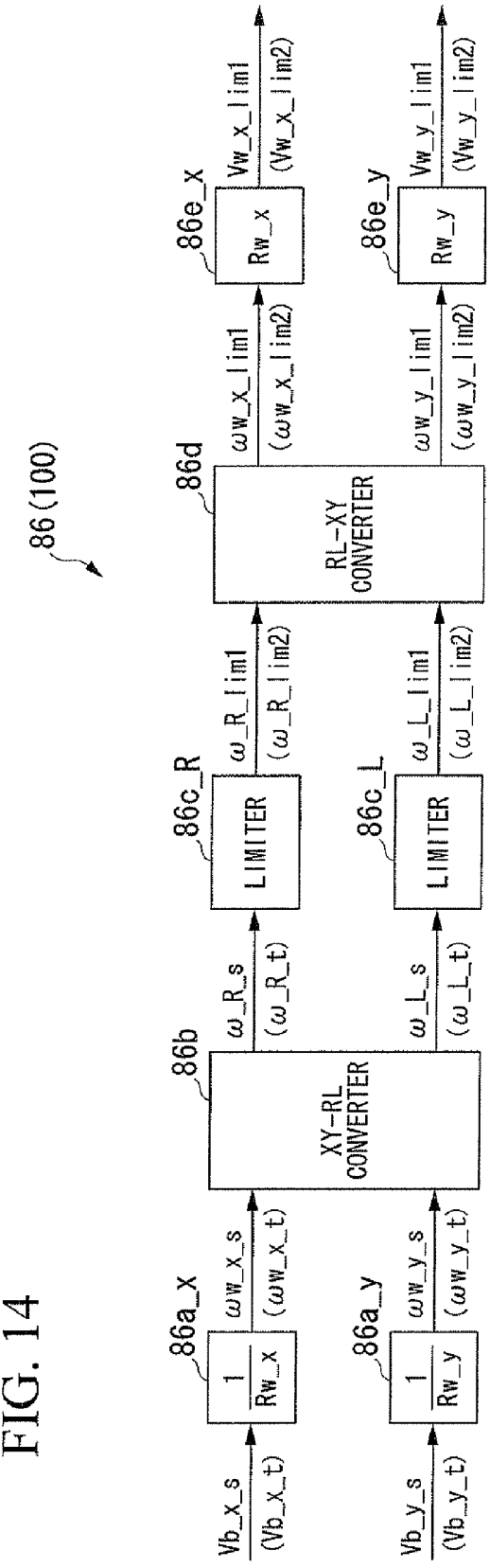
FIG. 14 is a functional block diagram of a limiting processor of the exemplary embodiment.

As shown in FIG. 13, the gain adjustor 78 inputs the inputted gravity center velocity estimated value Vb_x_s and Vb_y_s to a limiting processor 86. The limiting processor 86 generates output values Vw_x_lim1 and Vw_y_lim1 by adding a limit corresponding to the permitted range of the respective rotation angular velocity of the electric motor 31R, 31L as required to the gravity center velocity estimated values Vb_x_s and Vb_y_s. The output value Vw_x_lim1 has a meaning as the value after limiting of the moving velocity Vw_x in the X axis direction of the virtual wheel 62_x and the output value Vw_y_lim1 has a meaning as the value after limiting of the moving velocity Vw_y in the Y axis direction of the virtual wheel 62_y.

The process executed by the limiting processor 86 will be described in further detail making reference to FIG. 14. The reference symbols in the brackets in FIG. 14 refer to the process of the limiting processor 104 of the gravity center velocity restrictor 76 described below, and may be ignored with respect to the description in relation to the processing of the limiting processor 86.

The limiting processor 86, firstly, inputs the gravity center velocity estimated values Vb_x_s and Vb_y_s to the respective processors 86a_x and 86a_y. The processor 86a_x divides Vb_x_s by the radius Rw_x of the virtual wheel 62_x in order to calculate the rotation angular velocity ωw_x_s of the virtual wheel 62_x when it is assumed that the moving velocity of the virtual wheel 62_x in the X axis direction coincides with Vb_x_s. In the same manner, the processor 86a_y calculates the rotation angular velocity ωw_y_s (=Vb_y_s/Rw_y) of the virtual wheel 62_y when it is assumed that the moving velocity of the virtual wheel 62_y in the Y axis direction coincides with Vb_y_s.

Next, the limiting processor 86 converts the group including ωw_x_s and ωw_y_s to the group including the rotation angular velocity ω_R_s of the electric motor 31R and the rotation angular velocity ω_L_s of the electric motor 31L by the XY-RL converter 86b.

The conversion, in the present embodiment, is executed by solving the simultaneous equations obtained by substituting ωw_x, ωw_y, ω_R and ω_L in Equation (01a) and (01b) respectively into ωw_x_s, ωw_y_s, ω_R_s and ω_L_s with ω_R_s and ω_L_s as unknowns.

Then the limiting processor 86 inputs the output values ω_R_s and ω_L_s of the XY-RL converter 86b respectively to a limiter 86c_R, 86c_L. The limiter 86c_R outputs ω_R_s without modification as the output value ω_R_lim1 when ω_R_s is contained in the right motor permitted range that has preset predetermined values for a maximum value (>0) and a minimum value (<0). The limiter 86c_R outputs the boundary value near to ω_R_s among the maximum value and the minimum value of the right motor permitted range as the output value ω_R_lim1 when ω_R_s diverges from the right motor permitted range. In this manner, the output value ω_R_lim1 of the limiter 86c_R is limited to a value within the right motor permitted range.

In the same manner, the limiter 86c_L outputs ω_L_s without modification as the output value ω_L_lim1 when ω_L_s is contained in the left motor permitted range that has preset predetermined values of a maximum value (>0) and a minimum value (<0). The limiter 86c_L outputs the boundary value near to ω_L_s among the maximum value and the minimum value of the left motor permitted range as the output value ω_L_lim1 when ω_L_s diverges from the left motor permitted range. In this manner, the output value ω_L_lim1 of the limiter 86c_L is limited to a value within the left motor permitted range.

The right motor permitted range is a permitted range which is configured so that the rotation angular velocity (absolute value) of the right electric motor 31R does not becomes overly high, and is set in order to prevent a reduction in the maximum value of torque that can be output by the electric motor 31R. The same comments apply to the left motor permitted range.

Next, the limiting processor 86 converts the group including the respective output values ω_R_lim1 and ω_L_lim1 of the limiters 86c_R and 86c_L to the group including the respective rotation angular velocities ωw_x_lim1 and ωw_y_lim1 of the virtual wheel 62_x, 62_y by the RL-XY converter 86d.

This conversion is the opposite conversion process to the conversion process executed by the XY-RL converter 86b. This process is executed by solving the simultaneous equations obtained by substituting ωw_x, ωw_y, ω_R and ω_L in Equation (01a) and (01b) respectively into ωw_x_lim1, ωw_y_lim1, ω_R_lim1 and ω_L_lim1 with ωw_x_lim1 and ωw_y_lim1 as unknowns.

The limiting processor 86 inputs the output values ωw_x_lim1 and ωw_y_lim1 of the RL-XY converter 86d respectively into the processors 86e__x, 86e__y. The processor 86e__x converts ωw_x_lim1 to the moving velocity Vw_x_lim1 of the virtual wheel 62__x by multiplying the radius Rw_x of the virtual wheel 62__x and the ωw_x_lim1. In the same manner, the processor 86e__y converts ωw_y_lim1 to the moving velocity Vw_y_lim1 (=ωw_y_lim1·Rw_y) of the virtual wheel 62__y.

When the respective rotation angular velocities ω_R_s, ω_L_s of the electric motors 31R, 31L required to realize those moving velocities are both contained within the permitted range and the moving velocity Vw_x in the X axis direction of the virtual wheel 62__x and the moving velocity Vw_y in the Y axis direction of the virtual wheel 62__y are assumed to coincide with the respective gravity center velocity estimated values Vb_x_s, Vb_y_s (in other words, the moving velocity in the X axis direction and the moving velocity in the Y axis direction of the vehicle wheel 5 are assumed to respectively coincide with gravity center velocity estimated values Vb_x_s, Vb_y_s), the group of output values Vw_x_lim1 and Vw_y_lim1 that coincide respectively with Vb_x_s and Vb_y_s is outputted from the limiting processor 86, according to the processing of the limiting processor 86.

When both or one of the respective rotation angular velocities ω_R_s, ω_L_s of the electric motors 31R, 31L diverge from the permitted range, after limiting both or one of the rotation angular velocities forcibly to the permitted range, the group of the moving velocities Vw_x_lim1 and Vw_y_lim1 in the X axis direction and Y axis direction, that corresponds to the group of the respective rotation angular velocities ω_R_lim1 and of the electric motors 31R, 31L after limitation, is output from the limiting processor 86.

Under the essential necessary condition that the respective rotation angular velocities of the electric motors 31R, 31L corresponding to the group of output values Vw_x_lim1 and Vw_y_lim1 do not diverge from the permitted range, to the greatest degree possible, the limiting processor 86 generates a group of output values Vw_x_lim1 and Vw_y_lim1 so that the output values Vw_x_lim1 and Vw_y_lim1 coincide respectively with Vb_x_s and Vb_y_s.

Returning to the description of FIG. 13, the gain adjustor 78 executes the process of the calculator 88__x, 88__y. The gravity center velocity estimated value Vb_x_s in the X axis direction and the output value Vw_x_lim1 of the limiting processor 86 are inputted into the calculator 88__x. The calculator 88__x calculates and outputs the value Vover_x by subtracting Vb_x_s from Vw_x_lim1. The gravity center velocity estimated value Vb_y_s in the Y axis direction and the output value Vw_y_lim1 of the limiting processor 86 are inputted into the calculator 88__y. The calculator 88__y calculates and outputs the value Vover_y by subtracting Vb_y_s from Vw_y_lim1.

In this case, when a forcible limit is not executed with respect to the output values Vw_x_lim1 and the Vw_y_lim1 in the limiting processor 86, since the values Vw_x_lim1=Vb_x_s and Vw_y_lim1=Vb_y_s, the respective output values Vover_x and Vover_y of the calculator 88__x and 88__y are both become "0".

On the other hand, when the output value Vw_x_lim1 and Vw_y_lim1 of the limiting processor 86 are generated by forcibly limiting the input value Vb_x_s, Vb_y_s, the correction amount (=Vw_x_lim1−Vb_x_s) for Vw_x_lim1 corrected by Vb_x_s and the correction amount (=Vw_y_lim1−Vb_y_s) for Vw_y_lim1 corrected by Vb_y_s are respectively outputted from the calculator 88__x, 88__y.

Next, the gain adjustor 78 determines the gain adjustment parameter Kr_x by passing the output value Vover_x of the calculator 88__x in sequence through the processors 90__x and 92__x. The gain adjustor 78 determines the gain adjustment parameter Kr_y by passing the output value Vover_y of the calculator 88__y in sequence through the processors 90__y and 92__y. The gain adjustment parameter Kr_x and Kr_y are both values within the range from "0" to "1".

The processor 90__x calculates and outputs the absolute value of the inputted Vover_x. Furthermore the processor 92__x increases the output value Kr_x monotonically with respect to the input value |Vover_x| and thereby generates a value Kr_x that has saturation characteristics. When the input value reaches a certain dimension, these saturation characteristics are such characteristics that the amount of change in the output value with respect to the increase in the input value takes a value of "0" or takes a value of nearly "0".

In this embodiment, the processor 92__x outputs a value obtained by multiplying a predetermined value proportional coefficient by the input value |Vover_x| as Kr_x when the input value |Vover_x| is less than or equal to a preset predetermined value. Furthermore when the input value |Vover_x| is larger than a predetermined value, the processor 92__x outputs a value of "1" as Kr_x. The proportional coefficient is set so that the product of |Vover_x| and the proportional coefficient becomes a value of "1" when |Vover_x| coincides with the predetermined value.

The processing of the processor 90__y, 92__y is the same as the processing of the processor 90__x, 92__x as described above.

According to the processing of the gain adjustor 78 as described above, when a forcible limitation is not applied on the output values Vw_x_lim1 and Vw_y_lim1 by the limiting processor 86, that is to say, when the respective rotation angular velocities of the electric motor 31R, 31L are contained within the permitted range, even the electric motors 31R, 31L are driven so that the moving velocities Vw_x, Vw_y respectively in the X axis direction and Y axis direction of the vehicle wheel 5 coincide respectively with the gravity center velocity estimated value Vb_x_s, Vb_y_s, the gain adjustment parameters Kr_x, Kr_y are both determined to be "0".

On the other hand, when the output values Vw_x_lim1 and the Vw_y_lim1 of the limiting processor 86 are generated by forcibly limiting the input values Vb_x_s and Vb_y_s, that is to say, when the rotation angular velocity of either of the electric motors 31R, 31L diverges from the permitted range (when the absolute value of either of the rotation angular velocities is excessively high), while the electric motors 31R, 31L are driven so that the respective moving velocities Vw_x and Vw_y in the X axis direction and the Y axis direction of the vehicle wheel 5 coincide respectively with the gravity center velocity estimated values Vb_x_s, Vb_y_s, a value for the gain adjustment parameter Kr_x, Kr_y is respectively determined in response to the respective absolute values of the correction amount Vover_x and Vover_y. In this case, Kr_x has an upper limiting value of "1" and takes larger values as the absolute value of the correction amount Vx_over increases. The same comments apply to Kr_y.

Returning now to FIG. 12, the control unit 50 executes the processing of the gravity center velocity calculator 72 and the required gravity center velocity generator 74 in the manner described above, and then executes the processing of the lean angle determiner 91, the rotation center position determiner 92, and the front-back and left-right velocity command determiner 93.

The lean angle determiner 91 determines the target value θb_xy_obj (θb_x_obj and θb_y_obj) for the inclination of the electric vehicle 1. However since the electric vehicle 1 in the present embodiment is a two-wheeled vehicle, there is no requirement for control of the inclination in a fore-and-aft direction, and θb_x_obj takes a value of 0 (θb_x_obj=0). The target value θb_y_obj for the inclination in the lateral direction of the electric vehicle 1 is determined by information indicating the amount of intended turning of the electric vehicle 1 that is instructed by the controller 6, that is to say, it is uniquely determined by the turning angular velocity target value (for example, the value based on the amount of tilting of the controller 6 in a lateral direction or a diagonal direction) ωb_aim_z and the target value Vb_x_aim of the velocity in the X direction that is inputted from the required gravity center velocity generator 74. More specifically, it can be calculated by Equation (10), wherein g denotes gravitational acceleration.

$$\theta b\_y\_obj = \omega b\_aim\_z \times Vb\_x\_aim/g \quad \text{Equation (10)}$$

The lean angle determiner 91 inputs the calculated target value θb_y_obj (θb_x_obj=0) of the inclination in a lateral direction of the electric vehicle 1 into the deviation calculator 70.

Figure 15:
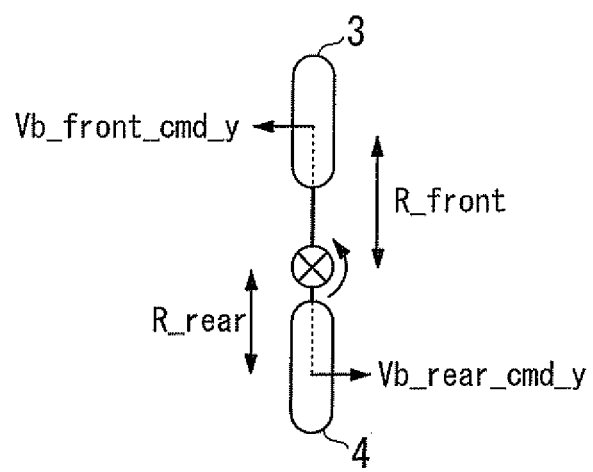
FIG. 15 is a schematic view showing a rotation center position of an electric vehicle of the exemplary embodiment.

The rotation center position determiner 92 determines the rotation center position of the electric vehicle 1. FIG. 15 is a schematic view showing a rotation center position of the electric vehicle 1. In this figure, the front wheel 3, the rear wheel 4 and the rotation center position are shown. The rotation center position is between the front wheel 3 and the rear wheel 4, and the position thereof varies in response to the acceleration of the electric vehicle 1. This position can be expressed as the ratio of the distance from the front wheel 3 and the distance from the rear wheel 4. In the present embodiment, the ratio of the distance from the front wheel 3 to the rotation center position and the distance from the rear wheel 4 to the rotation center position is R_front:R_rear. In the present embodiment, R_front:R_rear is normalized to thereby satisfy the relation R_front+R_rear=1.

Figure 16:
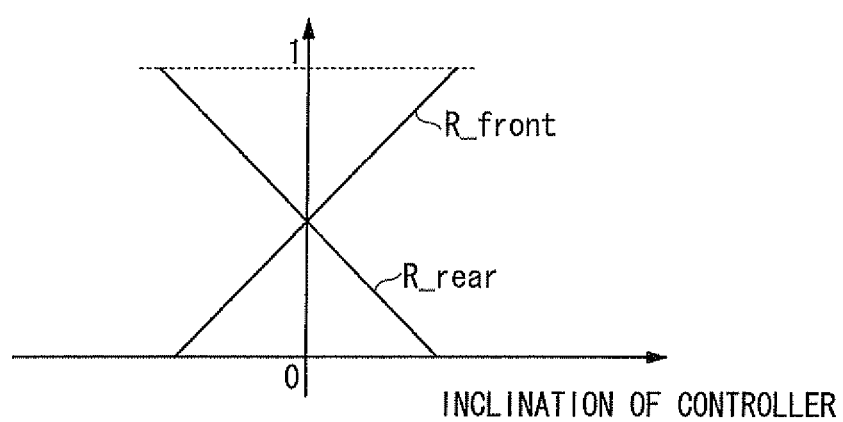
FIG. 16 shows the relationship between inclination of a controller and a value of R_front and a value of R_rear in the exemplary embodiment.

The value of R_front and the value of the R_rear are determined by the inclination detected by the controller 6. More specifically, the relationship between the value of R_front and the value of the R_rear and the inclination detected by the controller 6 is as shown in FIG. 16. FIG. 16 shows the relationship between the inclination detected by the controller 6 and the value of R_front and the value of R_rear. In the example shown in the figure, when the inclination detected by the controller 6 is 0°, the value of R_front and the value of the R_rear are respectively 0.5. Furthermore the value of R_front increases as the inclination detected by the controller 6 increases in a positive direction, and at the same time, the value of the R_rear decreases. Furthermore the value of R_front decreases as the inclination detected by the controller 6 increases in a negative direction, and at the same time, the value of the R_rear increases. As described above, any of the values for the inclination detected by the controller 6 is such that R_front+R_rear=1.

The rotation center position determiner 92 inputs information indicating the determined rotation center position of the electric vehicle 1, that is, the value of R_front and the value of the R_rear, into the front-rear and right-left velocity command determiner 93.

The front-rear and right-left velocity command determiner 93 calculates the required gravity center velocity Vb_front_cmd_xy (Vb_front_cmd_x and Vb_front_cmd_y) of the front wheel 3 used in the control of the front wheel 3 and the required gravity center velocity Vb_rear_cmd_xy (Vb_rear_cmd_x and Vb_rear_cmd_y) of the rear wheel 4 used in the control of the rear wheel 4.

In the present embodiment, in step S1, when the driver D riding on the seat portion 12 operates the controller 6, a movement operation of the main wheel 5 is controlled so that the electric vehicle 1 moves in the direction of inclination detected by the controller 6. Furthermore when the driver D applies their weight to the right or the left without operating the controller 6, the electric vehicle 1 performs translational motion towards the side on which the weight is applied, that is, in the moving direction of the gravity center. Thus the front-rear and right-left velocity command determiner 93 performs processing according to these two operations.

Firstly the operation of the front-rear and right-left velocity command determiner 93 will be described while in step S1 in which the driver D seated in the seat portion 12 inclines the controller 6.

In this case, the velocity in the X direction is the same value as the value calculated by the required gravity center velocity generator 74. Thus the rotation center position determiner 92 determines the value of Vb_front_cmd_x and the value of Vb_rear_cmd_x as the value of Vb_x_aim inputted from the required gravity center velocity generator 74.

Furthermore the velocity in the Y direction of the front wheel 3 can be calculated from Equation (11).

$$Vb\_front\_cmd\_y = R\_front \times \omega b\_aim\_z \quad \text{Equation (11)}$$

Furthermore the velocity in the Y direction of the rear wheel 4 can be calculated from Equation (12).

$$Vb\_rear\_cmd\_y = -R\_rear \times \omega b\_aim\_z \quad \text{Equation (12)}$$

As shown above, the front-rear and right-left velocity command determiner 93 calculates the required gravity center velocity Vb_front_cmd_xy (Vb_front_cmd_x and Vb_front_cmd_y) of the front wheel 3 used in the control of the front wheel 3 and the required gravity center velocity Vb_rear_cmd_xy (Vb_rear_cmd_x and Vb_rear_cmd_y) of the rear wheel 4 used in the control of the rear wheel 4, and inputs the calculation results to the gravity center velocity restrictor 76.

Next the operation of the front-rear and right-left velocity command determiner 93 will be described while in the step S1 in which the body weight of the driver D is applied to the right or to the left rather than operating the controller 6. In this case, the front-rear and right-left velocity command determiner 93 determines that forward and backward movement is not executed since there is no input from the controller 6 in the step S1, in other words, it is determined that only translational motion in a lateral direction is performed.

In this case, the front-rear and right-left velocity command determiner 93 takes the Vb_xy_aim value inputted from the required gravity center velocity generator 74 as Vb_front_cmd_xy (Vb_front_cmd_x and Vb_front_cmd_y) and Vb_rear_cmd_xy (Vb_rear_cmd_x and Vb_rear_cmd_y), and inputs the values into the gravity center velocity restrictor 76. In this manner, since the front wheel 3 and the rear wheel 4 perform the same motion, the electric vehicle 1 can perform translational motion in a right direction or in a left direction.

Next the control unit 50 executes the processing of the gravity center velocity restrictor 76. The gravity center velocity restrictor 76 respectively performs the control of the front wheel 3 and the control of the rear wheel 4. The processing performed by the gravity center velocity restrictor 76 for front wheel control and the gravity center velocity restrictor 76 for rear wheel control is the same process with the exception that the values inputted from the front-rear and right-left velocity command determiner 93 are different.

The gravity center velocity estimated value Vb_xy_s (Vb_x_s and Vb_y_s) calculated by the gravity center velocity calculator 72, and both, determined by the front-rear and right-left velocity command determiner 93, of the required gravity center velocity Vb_front_cmd_xy (Vb_front_cmd_x and Vb_front_cmd_y) used in the control of the front wheel 3 and the required gravity center velocity Vb_rear_cmd_xy (Vb_rear_cmd_x and Vb_rear_cmd_y) used in the control of the rear wheel 4, are inputted into the gravity center velocity restrictor 76. The gravity center velocity restrictor 76 determines the control target gravity center velocity Vb_front_xy_mdfd (Vb_front_x_mdfd and Vb_front_y_mdfd) used in control of the front wheel 3 and the control target gravity center velocity Vb_rear_xy_mdfd (Vb_rear_x_mdfd and Vb_rear_y_mdfd) used in control of the rear wheel 4 by executing the process shown in the block diagram in FIG. 17, using these input values.

More specifically, the gravity center velocity restrictor 76 firstly executes processing of the steady-state deviation calculator 94_x, 94_y. In the following processing, the control of the front wheel 3 and control of the rear wheel 4 is performed respectively in the same manner as the above description. Since the details of the processing of the control of the front wheel 3 and the control of the rear wheel 4 are the same, in the following description, no distinction will be made between the front wheel (_front) and the rear wheel (_rear).

The gravity center velocity estimated value Vb_x_s in the X axis direction is inputted into the steady-state deviation calculator 94_x. The previous value Vb_x_mdfd_p of the control target gravity center velocity Vb_x_mdfd in the X axis direction is inputted through the delay element 96_x into the steady-state deviation calculator 94_x. The steady-state deviation calculator 94_x firstly inputs the inputted value of Vb_x_s into the proportional differential compensation element (PD compensation element) 94a_x. The proportional differential compensation element 94a_x is a compensation element that has a transfer function expressed by 1+kd·S. The proportional differential compensation element 94a_x add the inputted Vb_x_s to a value calculated by multiplying the predetermined value's coefficient Kd by the differential value (rate of change with time) of Vb_x_s, and then output the value of the calculation result.

The steady-state deviation calculator 94_x calculates a value by subtracting the inputted Vb_x_mdfd_p from the output value of the proportional differential compensation element 94a_x using a calculator 94b_x, and then inputs the output value of the calculator 94b_x to a low-pass filter 94c_x that has a phase compensation function. The low-pass filter 94c_x is a filter that has a transfer function expressed by (1+T2·S)/(1+T1·S). The steady-state deviation calculator 94_x outputs the output value Vb_x_prd of the low-pass filter 94c_x.

The gravity center velocity estimated value Vb_y_s in the Y axis direction is inputted into the steady-state deviation calculator 94_y. The previous value Vb_y_mdfd_p of the control target gravity center velocity Vb_y_mdfd in the Y axis direction is inputted into the steady-state deviation calculator 94_y through the delay element 96_y.

The steady-state deviation calculator 94_y, in the same manner as the steady-state deviation calculator 94_x, executes the processing of the proportional differential compensation element 94a_y, the calculator 94b_y and the low-pass filter 94c_y in series, and outputs the output value Vb_y_prd of the low-pass filter 94c_y.

The output value Vb_x_prd of the steady-state deviation calculator 94_x includes a meaning as a steady-state deviation of the convergence predicted value of the future gravity center velocity estimated value in the X axis direction with respect to the control target gravity center velocity Vb_x_mdfd and is estimated from the current motion state (in other words, the motion state of the mass point 60_x of the inverted pendulum model seen from the Y axis direction) of the gravity center of the electric vehicle system seen from the Y axis direction. In the same manner, the output value Vb_y_prd of the steady-state deviation calculator 94_y includes a meaning as a steady-state deviation of the convergence predicted value of the future gravity center velocity estimated value in the Y axis direction with respect to the control target gravity center velocity Vb_y_mdfd and is estimated from the current motion state (in other words, the motion state of the mass point 60_y of the inverted pendulum model seen from the X axis direction) of the gravity center of the electric vehicle system seen from the X axis direction. Hereinafter, the respective output values Vb_x_prd, Vb_y_prd of the steady-state deviation calculators 94_x, 94_y will be referred to as the steady state predicted value of the gravity center velocity.

The gravity center velocity restrictor 76 firstly executes the processing of the steady-state deviation calculators 94_x, 94_y in the same manner as described above, and then uses the calculators 98_x, 98_y to respectively execute the processing of adding the required gravity center velocity Vb_x_aim to the output value Vb_x_prd of the steady-state deviation calculator 94_x and the processing of adding the required gravity center velocity Vb_y_aim to the output value Vb_y_prd of the steady-state deviation calculator 94_y.

Thus the output value Vb_x_t of the calculator 98_x is a velocity that adds the required gravity center velocity Vb_x_aim in the X axis direction to the steady state predicted value of the gravity center velocity Vb_x_prd in the X axis direction. In the same manner, the output value Vb_y_t of the calculator 98_y is a velocity that adds the required gravity center velocity Vb_y_aim in the Y axis direction to the steady state predicted value of the gravity center velocity Vb_y_prd in the Y axis direction.

When the required gravity center velocity Vb_x_aim in the X axis direction takes a value of "0", such as when the operational mode of the electric vehicle 1 is autonomous mode, the steady state predicted value of the gravity center velocity Vb_x_prd in the X axis direction becomes the output value Vb_x_t of the calculator 98_x without modification. In the same manner, when the required gravity center velocity Vb_y_aim in the Y axis direction takes a value of "0", the steady state predicted value of the gravity center velocity Vb_y_prd in the Y axis direction becomes the output value Vb_y_t of the calculator 98_y without modification.

The gravity center velocity restrictor 76 inputs the respective output values Vb_x_t, Vb_y_t from the calculators 98_x, 98_y into the limiting processor 100. The processing of the limiting processor 100 is the same as the processing of the limiting processor 86 of the gain adjustor 78. As shown by the reference symbols in brackets in FIG. 14, the only differences from the limiting processor 86 are the input value and output value of each processor of the limiting processor 100.

More specifically, the limiting processor 100 uses the respective processors 86*a*__*x*, 86*a*__*y* to calculate the rotation angular velocity ωw_x_t, ωw_y_t of each virtual wheel 62__*x*, 62__*y* when it is assumed the respective moving velocities Vw_x, Vw_y of each virtual wheel 62__*x*, 62__*y* respectively coincide with Vb_x_t, Vb_y_t. The group of the rotation angular velocities ωw_x_t, ωw_y_t is converted to the group of rotation angular velocities ω_R_t, ω_L_t of the electric motors 31R, 31L by the XY-RL converter 86*b*.

The rotation angular velocities ω_R_t, ω_L_t are limited to a value within the permitted range of the right motor and to a value within the permitted range of the left motor by the limiters 86*c*_R, 86*c*_L. The values ω_R_lim2, ω_L_lim2 after limitation processing are converted to the rotation angular velocities ωw_x_lim2, ωw_y_lim2 of the virtual wheels 62__*x*, 62__*y* by the RL-XY converter 86*d*.

The moving velocities Vw_x_lim2, Vw_y_lim2 of the virtual wheels 62__*x*, 62__*y* corresponding to each rotation angular velocity ωw_x_lim2, ωw_y_lim2 are calculated by respective processors 86*e*__*x*, 86*e*__*y*, and the moving velocities Vw_x_lim2, Vw_y_lim2 are output from the limiting processor 100.

In the same manner as the limiting processor 86, according to the processing of the limiting processor 100, under the essential necessary condition that the respective rotation angular velocities of the electric motors 31R, 31L corresponding to the group of output values Vw_x_lim2 and Vw_y_lim2 do not diverge from the permitted range, to the greatest degree possible, the limiting processor 100 generates a group of output values Vw_x_lim2 and Vw_y_lim2 so that the output values Vw_x_lim2 and Vw_y_lim2 coincide respectively with Vb_x_t and Vb_y_t.

The permitted range of the right motor and the left motor in the limiting processor 100 is not required to be the same as the permitted ranges in the limiting processor 86, and the permitted ranges may be set to mutually different ranges.

Figure 17:
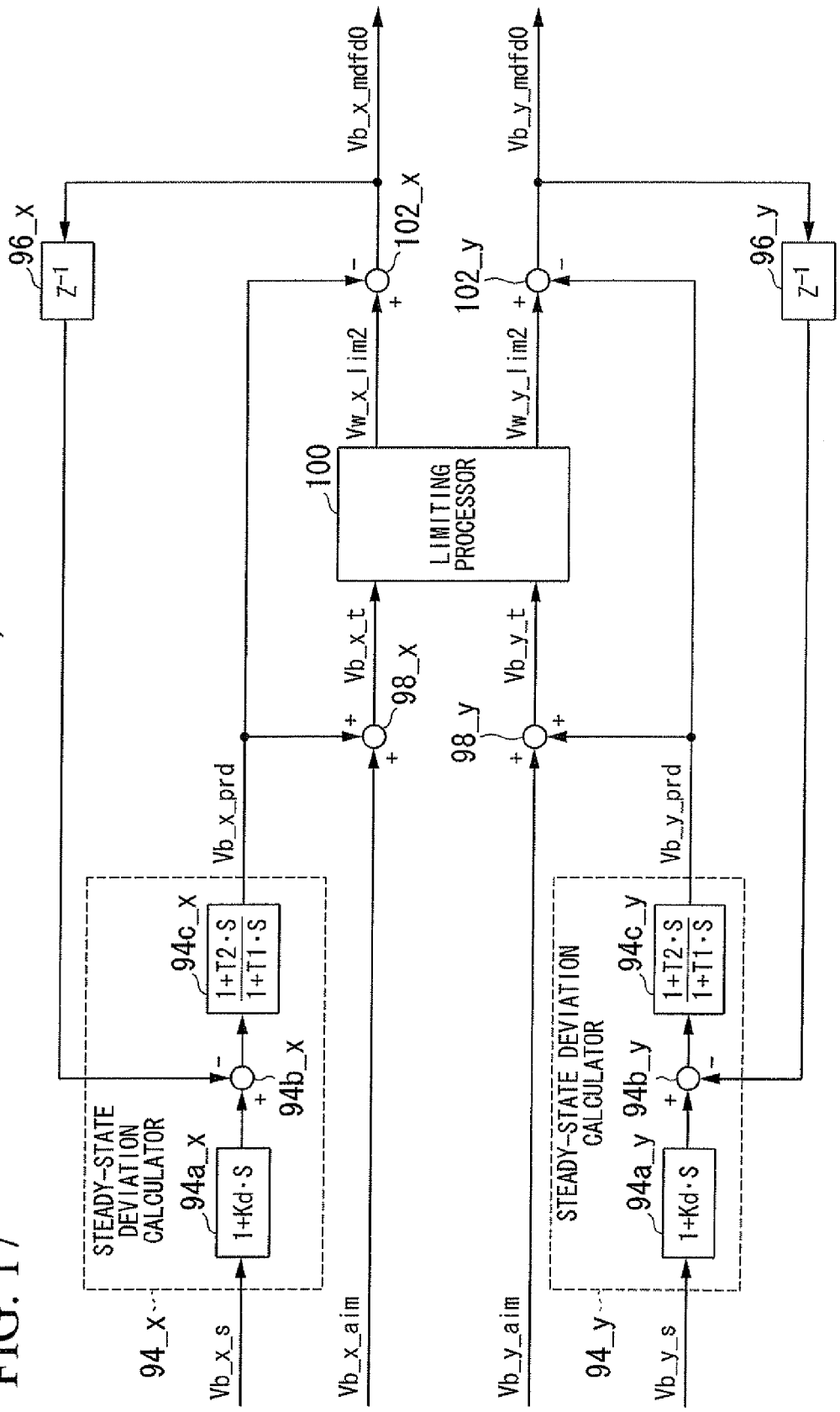
FIG. 17 is a functional block diagram of a gravity center velocity restrictor of the exemplary embodiment.

Returning to the description of FIG. 17, the gravity center velocity restrictor 76 calculates the respective control target gravity center velocities Vb_x_mdfd, Vb_y_mdfd by executing the processing of the calculators 102__*x*, 102__*y*. The calculator 102__*x* calculates the control target gravity center velocity Vb_x_mdfd in the X axis direction by subtracting the steady state predicted value of the gravity center velocity Vb_x_prd in the X axis direction from the output value Vw_x_lim2 of the limiting processor 100. In the same manner, the calculator 102__*y* calculates the control target gravity center velocity Vb_y_mdfd in the Y axis direction by subtracting the steady state predicted value of the gravity center velocity Vb_y_prd in the Y axis direction from the output value Vw_y_lim2 of the limiting processor 100.

In this case, when a forcible limit of the output value V_x_lim2, V_y_lim2 at the limiting processor 100 is not executed with respect to the control target gravity center velocities Vb_x_mdfd, Vb_y_mdfd determined in the above manner, that is to say, when the respective rotation angular velocities of the electric motors 31R, 31L are contained within the permitted range even when the electric motors 31R, 31L are driven so that the respective moving velocities in the X axis direction and Y axis direction of the vehicle wheel 5 coincide respectively with the output value Vb_x_t of the calculator 98__*x* and the output value Vb_y_t of the calculator 98__*y*, the required gravity center velocities Vb_x_aim and Vb_y_aim are determined without modification as the control target gravity center velocities Vb_x_mdfd, Vb_y_mdfd.

In this case, when the required gravity center velocity Vb_x_aim in the X axis direction takes a value of "0", the control target gravity center velocity Vb_x_mdfd in the X axis direction also takes a value of "0", and when the required gravity center velocity Vb_y_aim in the Y axis direction takes a value of "0", the control target gravity center velocity Vb_y_mdfd in the Y axis direction also takes a value of "0".

On the other hand, when the output values Vw_x_lim2 and the Vw_y_lim2 of the limiting processor 100 are generated by forcibly limiting the input values Vb_x_t and Vb_y_t, that is to say, when the rotation angular velocity of either of the electric motors 31R, 31L diverges from the permitted range (when the absolute value of either of the rotation angular velocities is excessively high) while the electric motors 31R, 31L are operated so that the respective moving velocities in the X axis direction and the Y axis direction of the vehicle wheel 5 coincide respectively with the output value Vb_x_t of the calculator 98__*x* and the output value Vb_y_t of the calculator 98__*y*, with respect to the X axis direction, the control target gravity center velocity Vb_x_mdfd in the X axis direction is determined as a value (the value obtained by adding the corrected value to Vb_x_aim) obtained by correcting the required gravity center velocity Vb_x_aim only the corrected amount (=Vw_x_lim2−Vb_x_t) of the output value Vw_x_lim2 of the limiting processor 100 from the input value Vb_x_t.

With respect to the Y axis direction, the control target gravity center velocity Vb_y_mdfd in the Y axis direction is determined as a value (the value obtained by adding the corrected value to Vb_y_aim) obtained by correcting the required gravity center velocity Vb_y_aim only the corrected amount (=Vw_y_lim2−Vb_y_t) of the output value Vw_y_lim2 of the limiting processor 100 from the input value Vb_y_t.

In this case, with respect to velocity in the X axis direction, for example, when the required gravity center velocity Vb_x_aim is not "0", the control target gravity center velocity Vb_x_mdfd takes a value closer to "0" than the required gravity center velocity Vb_x_aim, or takes a velocity in the opposite direction to the required gravity center velocity Vb_x_aim. Furthermore when the required gravity center velocity Vb_x_aim takes a value of "0", the control target gravity center velocity Vb_x_mdfd takes a velocity in a direction opposite to the steady state predicted value of the gravity center velocity Vb_x_prd in the X axis direction outputted by the steady-state deviation calculator 94__*x*. The above comments apply in the same manner to a velocity in the Y axis direction.

The description above is the processing performed by the gravity center velocity restrictor 76.

Returning to FIG. 12, the control unit 50 executes the processing of the gravity center velocity calculator 72, the gravity center velocity restrictor 76 and the gain adjustor 78 as described above, and then executes the processing of the posture control calculator 80.

Figure 18:
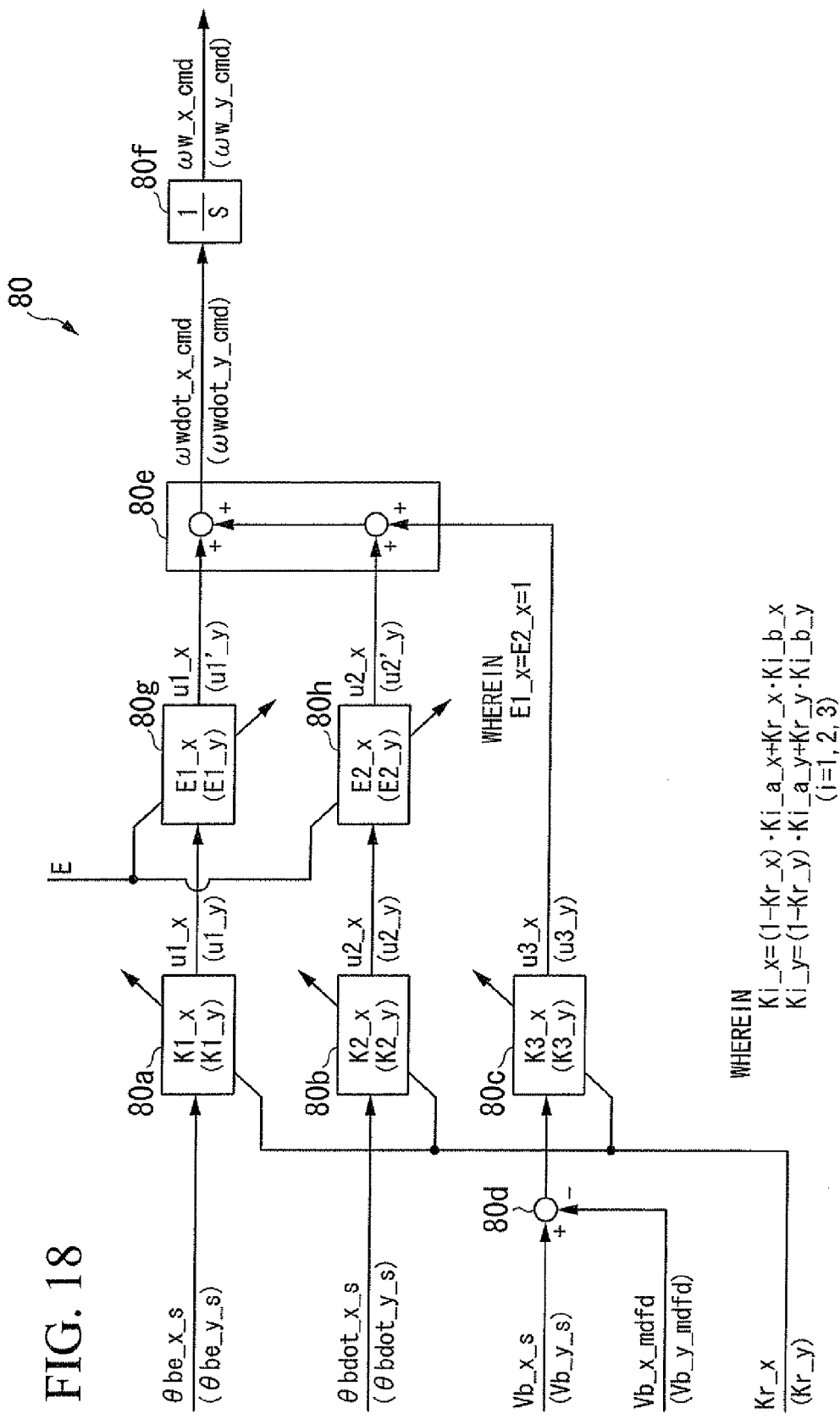
FIG. 18 is a functional block diagram of a posture control calculation restrictor of the exemplary embodiment.

The processing of the posture control calculator 80 will be described below with reference to FIG. 18. In FIG. 18, the reference symbols not in brackets are reference symbols related to the processing for determining the virtual wheel rotation angular velocity command ωw_x_cmd that is a target value of the rotation angular velocity of the virtual wheel 62__*x* rotating in the X axis direction. The reference symbols in brackets are reference symbols related to the processing for determining the virtual wheel rotation angular velocity command ωw_y_cmd that is a target value of the rotation angular velocity of the virtual wheel 62__*y* rotating in the Y axis direction.

The base inclination angle deviation measured value θbe_xy_s calculated by the deviation calculator 70, the base inclination angular velocity measured value θbdot_xy_s calculated in the step S2, the gravity center velocity estimated value Vb_xy_s calculated by the gravity center velocity calculator 72, the target gravity center velocity Vb_xy_cmd calculated by the gravity center velocity restrictor 76, and the gain adjustment parameter Kr_xy calculated by the gain adjustor 78 are inputted into the posture control calculator 80.

The posture control calculator 80 firstly uses the above input values to calculate the virtual wheel rotation angular acceleration command ωwdot_xy_cmd using Equations (07x) and (07y).

$$\omega wdot\_x\_cmd = K1\_x \cdot \theta be\_x\_s + K2\_x \cdot \theta bdot\_x\_s + K3\_x \cdot (Vb\_x\_s - Vb\_x\_mdfd) \quad \text{Equation (07x)}$$

$$\omega wdot\_y\_cmd = K1\_y \cdot \theta be\_y\_s + K2\_y \cdot \theta bdot\_y\_s + K3\_y \cdot (Vb\_y\_s - Vb\_y\_mdfd) \quad \text{Equation (07y)}$$

Thus in the present embodiment, the virtual wheel rotation angular acceleration command ωwdot_x_cmd which is the operational amount (control input) for controlling the motion of the mass point 60_x in the inverted pendulum model when seen from the Y axis direction (consequently the motion of the gravity center of the electric vehicle system when seen from the Y axis direction), and the virtual wheel rotation angular acceleration command ωwdot_y_cmd which is the operational amount (control input) for controlling the motion of the mass point 60_y in the inverted pendulum model when seen from the X axis direction (consequently the motion of the gravity center of the electric vehicle system when seen from the X axis direction) are respectively determined by adding the three operational components (the three terms on the right side of Equations (07x) and (07y)).

In this case, the gain coefficients K1_x, K2_x, K3_x that are related to each operational component in Equation (07x) are variably set in response to the gain adjustment parameter Kr_x. The gain coefficients K1_y, K2_y, K3_y that are related to each operational component in Equation (07y) are variably set in response to the gain adjustment parameter Kr_y. Hereinafter the gain coefficients K1_x, K2_x, K3_x in Equation (07x) may be respectively referred to as the first gain coefficient K1_x, the second gain coefficient K2_x, and the third gain coefficient K3_x. These comments apply in the same manner to the gain coefficients K1_y, K2_y, K3_y in Equation (07y).

The i-th gain coefficient Ki_x in Equation (07x) (i=1, 2, 3), and the i-th gain coefficient Ki_y in Equation (07y) (i=1, 2, 3) are determined in response to the gain adjustment parameter Kr_x, Kr_y from Equations (09x) and (09y) as shown by the proviso stated in FIG. 18.

$$Ki\_x = (1 - Kr\_x) \cdot Ki\_a\_x + Kr\_x \cdot Ki\_b\_x \quad \text{Equation (09x)}$$

$$Ki\_y = (1 - Kr\_y) \cdot Ki\_a\_y + Kr\_y \cdot Ki\_b\_y \quad \text{Equation (09y)}$$

(i=1, 2, 3)

The Ki_a_x, Ki_b_x in Equation (09x) are constant values which are set in advance as a gain coefficient value of the minimum side (the side close to "0") and a gain coefficient value of the maximum side (the side separated from "0") of the i-th gain coefficient Ki_x. These comments also apply in the same manner to Ki_a_y, Ki_b_y in Equation (09y).

Thus each i-th gain coefficient Ki_x (i=1, 2, 3) used in the calculations of Equation (07x) is determined as the arithmetic weighted mean of the corresponding constant value Ki_a_x, Ki_b_x. The respective weighting of Ki_a_x, Ki_b_x varies in response to the gain adjustment parameter Kr_x. Therefore, when Kr_x equals 0 (Kr_x=0), Ki_x=Ki_a_x, and when Kr_x equals 1 (Kr_x=1), Ki_x=Ki_b_x. As Kr_x approaches a value of "1" from a value of "0", the i-th gain coefficient Ki_x approaches a value of Ki_b_x from a value of Ki_a_x.

In the same manner, each i-th gain coefficient Ki_y (i=1, 2, 3) used in the calculations of Equation (07y) is determined as the arithmetic weighted mean of the corresponding constant value Ki_a_y, Ki_b_y. The respective weighting of Ki_a_y, Ki_b_y varies in response to the gain adjustment parameter Kr_y. In the same manner as Ki_x, as the value of Kr_y varies between "0" and "1", the value of the i-th gain coefficient Ki_y varies between Ki_a_y and a value of Ki_b_y.

In addition, the constant values Ki_a_x, Ki_b_x and Ki_a_y, Ki_b_y (i=1, 2, 3) are included in the constant parameter that has a value set in step S6 or step S8.

The posture control calculator 80 calculates the virtual wheel rotation angular acceleration command ωwdot_x_cmd, that is related to the virtual wheel 62_x which rotating in the X axis direction, by performing the calculation of Equation (07x) using the first to third gain coefficients K1_x, K2_x, K3_x as determined above.

More particularly, with reference to FIG. 18, the posture control calculator 80 uses the processors 80a, 80b to respectively calculate the operational component u1_x by multiplying the first gain coefficient K1_x by the base inclination angle deviation measured value θbe_x_s, and to calculate the operational component u2_x by multiplying the second gain coefficient K2_x by the base inclination angular velocity measured value θbdot_x_s. Then the posture control calculator 80 uses the calculator 80d to calculate the deviation (=Vb_x_s−Vb_x_mdfd) between the gravity center velocity estimated value Vb_x_s and the control target gravity center velocity Vb_x_mdfd, and uses the processor 80c to calculate the operational component u3_x by multiplying the third gain coefficient K3_x by this deviation. The posture control calculator 80 calculates the virtual wheel rotation angular acceleration command θwdot_x_cmd by adding the operational components u1_x, u2_x, u3_x in a calculator 80e.

In the same manner, the posture control calculator 80 calculates the virtual wheel rotation angular acceleration command ωwdot_y_cmd in relation to the virtual wheel 62_y which rotating in the Y axis direction, by performing the calculation of Equation (07y) using the first to third gain coefficients K1_y, K2_y, K3_y as determined above.

In this case, the posture control calculator 80 uses the processor 80a, 80b to respectively calculate the operational component u1_y by multiplying the first gain coefficient K1_y by the base inclination angle deviation measured value θbe_y_s, and to calculate the operational component u2_y by multiplying the second gain coefficient K2_y by the base inclination angular velocity measured value θbdot_y_s. In addition, the posture control calculator 80 uses the calculator 80d to calculate the deviation (=Vb_y_s−Vb_y_mdfd) between the gravity center velocity estimated value Vb_y_s and the control target gravity center velocity Vb_y_mdfd, and uses the calculator 80c to calculate the operational component u3_y by multiplying the third gain coefficient K3_y by this deviation. The posture control calculator 80 calculates the virtual wheel rotation angular acceleration command ωwdot_y_cmd by adding the operational components u1_y, u2_y, u3_y in a calculator 80e.

The first term (=first operational component u1_x) and the second term (=second operational component u2_x) on the right side of Equation (07x) includes the significance as a feedback operational component that converges the base inclination angle deviation measured value θbe_x_s about the Y axis towards "0" using the PD rule (proportional•derivative rule) as a feedback control rule (converges the base inclination angle measured value θb_x_s to a target value θb_x_obj).

The third term (=third operational component u3__x) on the right side of Equation (07x) includes the significance as a feedback operational component that converges the deviation between the gravity center velocity estimated value Vb_x_s and the target gravity center velocity Vb_x_mdfd towards "0" using a proportional rule as a feedback control rule (converges Vb_x_s to Vb_x_mdfd).

These comments also apply in the same manner to the first to third terms (first to third operational components u1__y, u2__y, u3__y) on the right side of Equation (07y).

The posture control calculator 80 calculates the virtual wheel rotation angular acceleration commands ωwdot_x_cmd, ωwdot_y_cmd, and then determines the virtual wheel rotation velocity command ωw_x_cmd, ωw_y_cmd by integrating ωwdot_x_cmd and ωwdot_y_cmd respectively with an integrator 80*f*.

The above description provides the details of the processing executed by the posture control calculator 80.

In addition, the virtual wheel rotation angular acceleration command ωwdot_x_cmd may be calculated by separating the third term on the right side of Equation (07x) into an operational component (=K3__x·Vb_x_s) based on Vb_x_s and an operational component (=−K3__x·Vb_x_mdfd) based on Vb_x_mdfd. In the same manner, the rotation angular velocity command for the virtual wheels ωwdot_y_cmd may be calculated by separating the third term on the right side of Equation (07y) into an operational component (=K3__y·Vb_y_s) based on Vb_y_s and an operational component (=−K3__y·Vb_y_mdfd) based on Vb_y_mdfd.

In the present embodiment, the rotation angular acceleration command ωw_x_cmd, ωw_y_cmd for the virtual wheels 62__*x*, 62__*y* is used as the operational amount (control input) for controlling the behavior of the gravity center of the electric vehicle system. However the drive torque of the virtual wheels 62__*x*, 62__*y*, or the translational force obtained by multiplying the radius Rw_x, Rw_y of each virtual wheel 62__*x*, 62__*y* by the drive torque (in other words, the frictional force between the virtual wheels 62__*x*, 62__*y* and the road surface) may be used as an operational amount.

Returning now to FIG. 12, the control unit 50 determines the velocity command ω_R_cmd of the electric motor 31R and the velocity command ω_L_cmd of the electric motor 31L by inputting the virtual wheel rotation velocity commands ωw_x_cmd, ωw_y_cmd determined above by the posture control calculator 80 into the motor command calculator 82 and executing the processing of the motor command calculator 82. The processing of the motor command calculator 82 is the same as the processing of the XY-RL converter 86*b* of the limiting processor 86 (refer to FIG. 14).

More specifically, the motor command calculator 82 determines the respective velocity commands ω_R_cmd, ω_L_cmd of the electric motors 31R, 31L by solving the simultaneous equation obtained by substituting ωw_x, ωw_y, ω_R and ω_L in Equation (01a) and (01b) respectively with ωw_x_cmd, ωw_y_cmd, ω_R_cmd and ω_L_cmd with ω_R_cmd and ω_L_cmd as unknowns.

In this manner the electric vehicle control calculation processing in step S9 is completed.

The control unit 50 as described above performs control calculation processing to determine a virtual wheel rotation angular acceleration command ωwdot_xy_cmd as an operational amount (control input) so that when in either riding mode or autonomous mode, basically the posture of the base 9 is maintained to a posture in which both the base inclination angle deviation measured values θbe_x_s, θbe_y_s take a value of "0" (hereinafter, this posture is termed the "basic posture"). In other words, it is maintains a state in which the position of the gravity center of the electric vehicle system (the overall gravity center of the electric vehicle and rider, or the electric vehicle single gravity center) positioned substantially directly above the floor surface of the vehicle wheels 5. More particularly, the virtual wheel rotation angular acceleration command ωwdot_xy_cmd is determined, while the posture of the base 9 is maintained to the basic posture, so that the gravity center velocity estimated value Vb_xy_s which acts as an estimated value of the moving velocity of the gravity center of the electric vehicle system converges toward the control target gravity center velocity Vb_xy_mdfd. The control target gravity center velocity Vb_xy_mdfd normally takes a value of "0" (more particularly, to the extent that an additional impelling force does not applied to the electric vehicle 1 by the rider or the like during the riding mode). In this case, the virtual wheel rotation angular acceleration command ωwdot_xy_cmd is determined so that the gravity center of the electric vehicle system remains substantially static while the posture of the base 9 is maintained at the basic posture.

The respective rotation angular velocities of the electric motors 31R, 31L which is obtained by converting the virtual wheel rotation angular velocity command ωw_xy_cmd which is obtained by integrating each component of ωwdot_xy_cmd, are determined as velocity commands ω_R_cmd, w_L_cmd of the electric motors 31R, 31L. The rotation velocity of the electric motors 31R, 31L is controlled according to these velocity commands ω_R_cmd, ω_L_cmd. Consequently, the respective moving velocities in the X axis direction or Y axis directions of the vehicle wheels 5 is controlled to coincide with the moving velocity of the virtual wheel 62__*x* corresponding to ωw_x_cmd and the moving velocity of the virtual wheel 62*y* corresponding to ωw_y_cmd.

For example, when the actual base inclination angle θb_y deviates from the target value θb_y_obj to a right inclination about the X axis, the vehicle wheel 5 moves towards the right in order to cancel out that deviation (in order to converge θb_y_s to a value of "0"). In the same manner, when the actual base inclination angle θb_y deviates from the target value θb_y_obj to a left inclination, the vehicle wheel 5 moves towards the left in order to cancel out that deviation (in order to converge θb_y_s to a value of "0").

When the actual base inclination angle θb_y deviates from the target value θb_y_obj, since the movement operation in the lateral direction of the vehicle wheels 5 is configured to cancel out a deviation of θb_y, the vehicle wheel 5 moves towards the combined direction of the X axis direction and the Y axis direction (the direction of incline with respect to both of the X axis direction and the Y axis direction).

In this manner, when the base 9 inclines from the basic posture towards the Y axis direction, the vehicle wheel 5 moves toward the side of inclination in the Y axis direction. Thus for example, when in riding mode, when the rider intentionally inclines their upper body towards the Y axis direction, the vehicle wheel 5 moves toward the direction of inclination in the Y axis direction.

When the control target gravity center velocity Vb_x_mdfd, Vb_y_mdfd takes a value of "0", if the posture of the base 9 converges towards the basic posture, then the movement of the vehicle wheels 5 will substantially stop. Furthermore for example, when the inclination angle θb_x about the Y axis direction of the base 9 is maintained at a constant angle inclining from the basic posture, the moving velocity of the vehicle wheel 5 in the X axis direction converges to the constant moving velocity corresponding to that angle (the moving velocity has a constant steady-state deviation with the control target gravity center velocity Vb_x_mdfd). These comments also apply in the same manner when the inclination angle θb_y about the X axis direction of the base 9 is maintained at a constant angle inclined from the basic posture.

For example when both the required gravity center velocities Vb_x_aim, Vb_y_aim generated by the required gravity center velocity generator 74 take a value of "0", the inclination amount of the base 9 from the basic posture (the base inclination angle deviation measured value θbe_x_s, θbe_y_s) becomes relatively large. Therefore, a state associated with excessive moving velocity may arise in which that inclination amount will be cancelled out, or in which the moving velocity of the vehicle wheel 5 in one or both of the X axis direction and the Y axis direction that is required to maintain that inclination amount (these moving velocities respectively correspond to the steady state predicted value of the gravity center velocity Vb_x_prd, Vb_y_prd as shown in FIG. 17) will make one or both of the rotation angular velocities of the electric motors 31R, 31L diverge from the permitted range. In such a state, a velocity in the opposite direction to the moving velocity of the vehicle wheels 5 (more particularly, Vw_x_lim2−Vb_x_prd and Vw_y_lim2−Vb_y_prd) is determined as a control target gravity center velocity Vb_x_mdfd, Vb_y_mdfd. The operational component u3_x, u3_y of the operational components forming the control input is determined so that the gravity center velocity estimated values Vb_x_s, Vb_y_s respectively converge towards the control target gravity center velocities Vb_x_mdfd, Vb_y_mdfd. As a result, the inclination amount of the base 9 from the basic posture can be prevented in advance from becoming excessively large, or the rotation angular velocity of one or both of the electric motors 31R, 31L can be prevented from becoming excessively high.

In the gain adjustor 78, one or both of the gravity center velocity estimated values Vb_x_s, Vb_y_s increase, and in a state associated with a risk of an excessive moving velocity may arise in which the inclination of the base 9 from the basic posture is cancelled out, or in which the moving velocity of the vehicle wheels 5 in one or both of the X axis direction and the Y axis direction that is required to maintain the inclination amount will make one or both of the rotation angular velocities of the electric motors 31R, 31L diverge from the permitted range, to the degree that such divergence becomes conspicuous (more particularly, as the absolute value of Vover_x, Vover_y as shown in FIG. 13 increases), one or both of the gain adjustment parameters Kr_x, Kr_y diverges from "0" and approaches a value of "1".

Each of the i-th gain coefficients Ki_x (i=1, 2, 3) calculated by the Equation (09x) approach the maximum constant value Ki_b_x from the minimum constant value Ki_a_x as Kr_x approaches a value of "1". These comments also apply in the same manner to each i-th gain coefficient Ki_y (i=1, 2, 3) calculated by the Equation (09y).

The sensitivity of the operational amount (the virtual wheel rotation angular acceleration command ωwdot_x_cmd, ωwdot_y_cmd) with respect to the variation in the inclination of the base 9 is increased as the absolute value of the gain coefficient increases. Consequently when an increase in the inclination amount of the base 9 from the basic posture is likely, the moving velocity of the vehicle wheel 5 is controlled so that the inclination is promptly cancelled out. Thus a large inclination of the base 9 from the basic posture can be strongly suppressed, and it is possible to prevent the moving velocity of the vehicle wheels 5 in one or both of the X axis direction and the Y axis direction from reaching an excessive moving velocity at which the rotation angular velocity of one or both of the electric motors 31R, 31L will diverge from the permitted range.

In the riding mode, when the required gravity center velocity generator 74 generates a required gravity center velocity Vb_x_aim, Vb_y_aim (a required gravity center velocity in which one or both of Vb_x_aim and Vb_y_aim do not take a value of "0") in response to a request for a steering operation from the driver, the required gravity center velocities Vb_x_aim, Vb_y_aim are respectively determined as the control target gravity center velocities Vb_x_mdfd, Vb_y_mdfd as long as a high-speed rotation angular velocity does not result in divergence of the rotation angular velocity of one or both of the electric motors 31R, 31L from the permitted range (more particularly, as long as the Vw_x_lim2, Vw_y_lim2 shown in FIG. 17 coincide respectively with Vb_x_t, Vb_y_t). Consequently, the moving velocity of the vehicle wheel 5 is controlled in order to realize the required gravity center velocity Vb_x_aim, Vb_y_aim (so that the actual gravity center velocity approaches the required gravity center velocity Vb_x_aim, Vb_y_aim).

As described above, according to the present embodiment, the controller 6 detects a command for acceleration and deceleration or a command for turning. Furthermore an inclination sensor 52 detects the inclination of the vehicle body 2. The control unit 50 controls acceleration or deceleration of the vehicle body 2 based on an acceleration and deceleration command detected by the controller 6, or controls turning of the vehicle body 2 based on a turning command detected by the controller 6, or controls translational motion in a lateral direction of the vehicle body 2 based on the inclination of the vehicle body 2 detected by the inclination sensor 52. In other words, inverted pendulum control is performed only in one direction (lateral direction), and other directions (fore-and-aft direction) are controlled according to a command from the controller. In this manner, the electric vehicle 1 can perform translational motion according to the inclination of the base in addition to acceleration and deceleration according to an acceleration and deceleration command or turning according to a turning command.

When a driver D seated on the seat portion 12 operates the controller 6, the controller 6 detects a command of acceleration and deceleration or turning, and the control unit 50 controls the movement operation of the main wheel 5 so that the electric vehicle 1 moves in response to the detection result. Furthermore when the driver D applies their body weight to the right or the left rather than operating the controller 6, the electric vehicle 1 performs translational motion to the side on which the weight is applied. In this manner, the electric vehicle 1 can perform translational motion in which the front wheel 3 and the rear wheel 4 are driven in the same direction or can turn by driving the front wheel 3 and the rear wheel 4 in mutually opposite directions with respect to the Y axis direction.

In the present embodiment, when the electric vehicle 1 performs turning, although an example has been described in which the front wheel 3 and the rear wheel 4 are driven in mutually opposite directions with respect to the Y axis direction, the invention is not limited in this regard. For example, either of the front wheel 3 and the rear wheel 4 may be driven with respect to the Y axis direction in order to turn the electric vehicle 1. Furthermore when the turning command value is higher than a predetermined value, a target inclination angle in lateral direction or a target moving velocity in lateral direction may be set in response to that value. In this manner, the vehicle position can be rapidly changed by setting a target inclination angle (θb_obj) or a target moving velocity (θb_aim) to the center of the turn when rapid turning is required.

Although an example was described in the present embodiment in which the electric vehicle 1 is a two-wheeled vehicle, the invention is not limited in this regard. For example, the electric vehicle 1 may comprise a plurality of vehicle wheels, such as a three-wheeled vehicle or a four-wheeled vehicle. Furthermore the electric vehicle 1 may use a known controller such as a steering wheel and an accelerator and brake as the controller.

Figure 19:
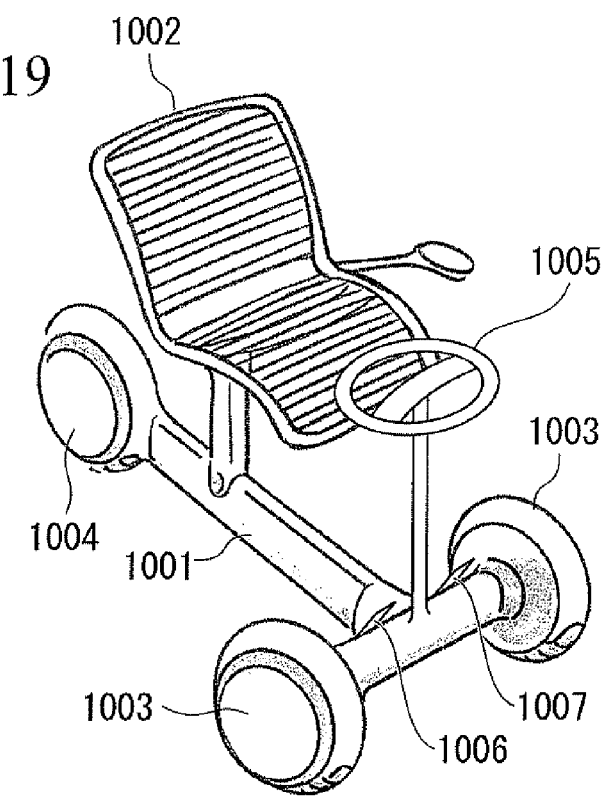
FIG. 19 is a perspective view seen from the front side of a three-wheeled electric vehicle.

FIG. 19 is a perspective view seen from the front side of a three-wheeled electric vehicle 1. In the example shown in the figure, the electric vehicle 1 comprises two front wheels 1003 and one rear wheel 1004. Furthermore the electric vehicle 1 comprises a steering wheel 1005, an accelerator 1006 and a brake 1007 as the controller. Furthermore there may be two rear wheels.

Figure 20:
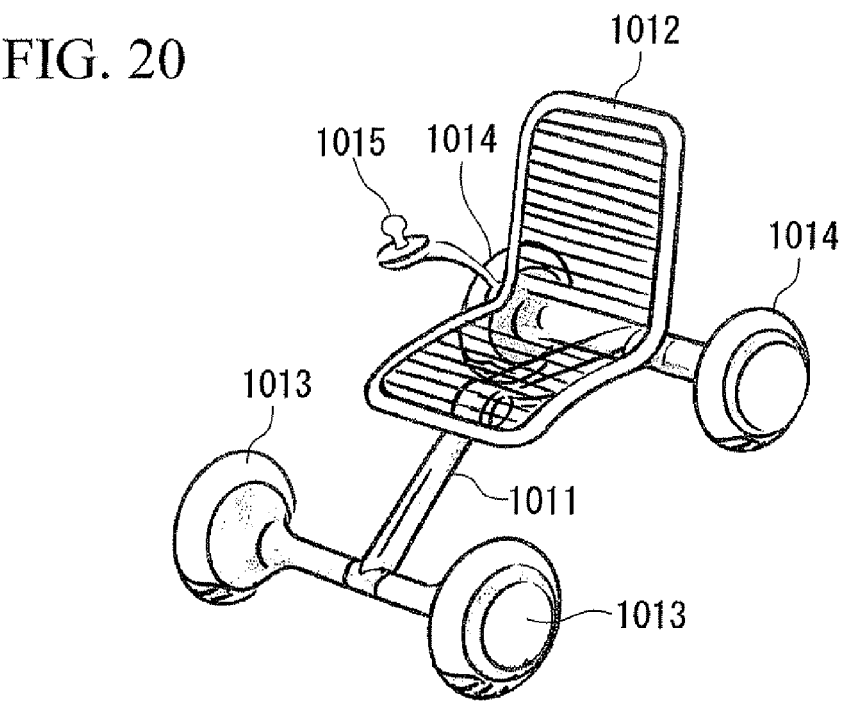
FIG. 20 is a perspective view seen from the front side of a four-wheeled electric vehicle.

FIG. 20 is a perspective view seen from the front side of a four-wheeled electric vehicle 1. In the example shown in the figure, the electric vehicle 1 comprises two front wheels 1013 and two rear wheels 1014.

Figure 21:
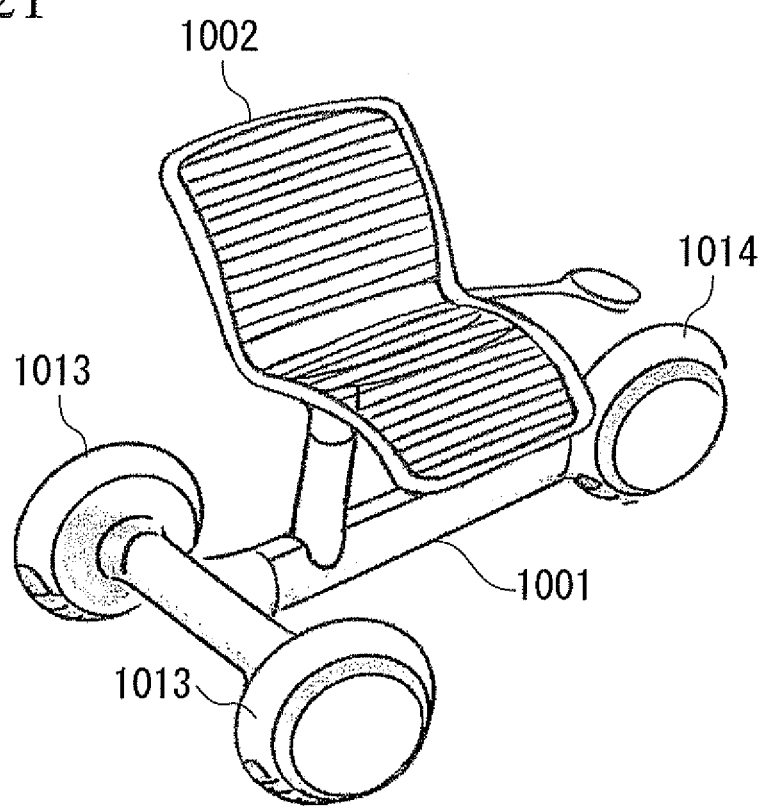
FIG. 21 is a perspective view seen from the rear side of an electric vehicle in which a seat member is rotated through 90° about the Z axis.
Figure 22:
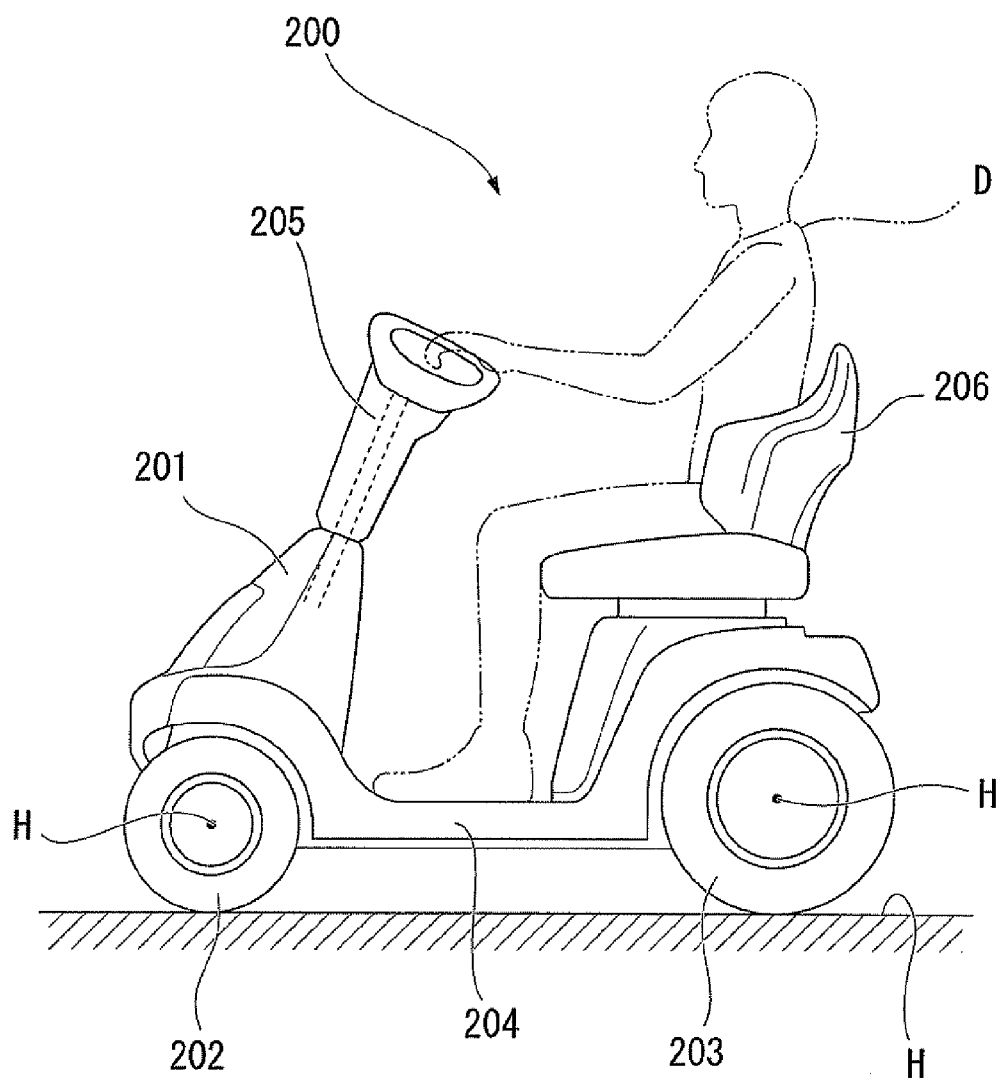
FIG. 22 is a side view showing a conventional electric vehicle.

Furthermore the seat portion may rotate through 90° about the Z axis to facilitate sitting on the electric vehicle 1 by the driver D. FIG. 21 is a perspective view seen from the rear side of an electric vehicle 1 in which a seat portion is rotated through 90° about the Z axis. In the example shown in the figure, in comparison to the electric vehicle 1 shown in FIG. 19, the seat portion 1002 provided on the electric vehicle 1 shown in FIG. 21 can rotate through 90° about the Z axis.

While exemplary embodiments have been described and illustrated above with respect to the figures, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description.

What is claimed is:

1. An electric vehicle comprising:
   a base;
   a movement operator that has at least one omnidirectional drive wheel which can be driven omnidirectionally;
   a seat member that is mounted on the base;
   a first control input system comprising:
      a hand operable control device;
      an acceleration and deceleration command unit that detects an acceleration and deceleration command, the acceleration and deceleration command unit determining acceleration and deceleration commands based on an operation of the hand operable control device; and
      a turning command unit that detects a turning command based on an operation of the hand operable control device;
   a second control input system independent of the first control input system and comprising an inclination detection unit operable to detect inclination parameters related to an inclination of the base caused by a leaning movement of the base; and
   a control unit that determines an inclination of the base based on the inclination parameters, the control unit operable to control acceleration and deceleration of the base, turning of the base, and translational motion of the base, the acceleration and deceleration of the base being based on the acceleration and deceleration command detected by the acceleration and deceleration command unit, the turning of the base being based on the turning command detected by the turning command unit, and the translational motion of the base being based on the inclination of the base determined by the control unit, wherein:
   acceleration and deceleration are related to a fore-aft movement of the vehicle, and said acceleration and deceleration commands are based on the operation of the hand operable control device; and
   said translational motion is a lateral side-to-side motion of the vehicle and is controlled, based on the inclination of the base, simultaneously with and independently of the operation of the hand operable control device.

2. The electric vehicle according to claim 1, wherein the control unit controls the turning of the base such that the base is inclined during the turning.

3. The electric vehicle according to claim 2, further comprising a rotation center position determination unit that calculates a position of a rotation center during the turning according to at least one of a velocity of the base or an acceleration of the base.

4. The electric vehicle according to claim 1, further comprising a rotation center position determination unit that calculates a position of a rotation center during the turning according to at least one of a velocity of the base or an acceleration of the base.

5. An electric vehicle comprising:
   a base;
   a first omnidirectional drive wheel that is mounted on the base and can be driven omnidirectionally;
   a second omnidirectional drive wheel that is mounted on the base so that a symmetry axis thereof is parallel with a symmetry axis of the first omnidirectional drive wheel;
   a seat member that is mounted on the base so that a straight line connecting a wheel center of the first omnidirectional drive wheel and a wheel center of the second omnidirectional drive wheel specifies a fore-and-aft direction;
   a first control input system comprising:
      a hand operable control device;
      an acceleration and deceleration command unit that detects an acceleration and deceleration command, the acceleration and deceleration command unit determining acceleration and deceleration commands based on an operation of the hand operable control device; and
      a turning command unit that detects a turning command based on an operation of the hand operable control device;
   a second control input system independent of the first control input system and comprising an inclination detection unit operable to detect inclination parameters related to an inclination of the base caused by a leaning movement of the base; and
   a control unit that determines an inclination of the base based on the inclination parameters, the control unit operable to control acceleration and deceleration of the base, turning of the base, and translational motion of the base, the acceleration and deceleration of the base being based on the acceleration and deceleration command detected by the acceleration and deceleration command unit, the turning of the base being based on the turning command detected by the turning command unit, and the translational motion of the base being based on the inclination of the base determined by the control unit detection unit;

wherein:
acceleration and deceleration are related to a fore-aft movement of the vehicle, and said acceleration and deceleration commands are based on the operation of the hand operable control device; and said translational motion is a lateral side-to-side motion of the vehicle and is controlled, based on the inclination of the base, simultaneously with and independently of the operation of the hand operable control device.

6. The electric vehicle according claim 5, wherein the straight line is parallel to the fore-and-aft direction of the seat member.

7. The electric vehicle according to claim 5, wherein:
said first omnidirectional drive wheel comprises a first toroidal main wheel formed from a rubber-based elastic material and at least a first motor,
said second omnidirectional drive wheel comprises a second toroidal main wheel formed from a rubber-based elastic material and at least a second motor,
said first motor provides a drive force for said first omnidirectional drive wheel, and
said second motor provides a driver force for said second omnidirectional drive wheel.

8. The electric vehicle according to claim 5, further comprising a rotation center position determination unit that calculates a position of a rotation center during the turning according to at least one of a velocity of the base or an acceleration of the base, wherein:
the acceleration is based on the operation of the hand operable control device,
the rotation center position is located on the straight line between the first omnidirectional drive wheel and the second omnidirectional drive wheel,
the rotation center moves in a direction towards the first omnidirectional drive wheel when a moving direction information indicating the moving toward the first omnidirectional drive wheel is input into the hand operable control device, and
the rotation center moves in a direction towards the second omnidirectional driver wheel when a moving direction information indicating the moving toward the second omnidirectional drive wheel is input into the hand operable control device.

9. The electric vehicle according to claim 5, wherein said seat member comprises a pair of armrests, the pair of armrests extend forward from an intermediate portion of the seat back and the hand operable control device is located at a distal end of one of the armrests.

10. An electric vehicle comprising:
a base;
a movement operator that has at least one omnidirectional drive wheel which can be driven omnidirectionally;
a seat member that is mounted on the base;
a first control input system comprising:
a hand operable control device;
an acceleration and deceleration command unit that detects an acceleration and deceleration command, the acceleration and deceleration command unit determining acceleration and deceleration commands based on an operation of the hand operable control device; and
a turning command unit that detects a turning command based on an operation of the hand operable control device;
a second control input system independent of the first control input system and comprising an inclination detection unit, the inclination detection unit detecting inclination parameters related to an inclination of the base caused by a leaning movement of the base; and
a control unit that determines an inclination of the base based on the inclination parameters, the control unit operable to control:
acceleration and deceleration of the base based on the acceleration and deceleration command detected by the acceleration and deceleration command unit,
turning of the base based on the turning command detected by the turning command unit, and
translational motion based on the operation of the hand operable control device or the inclination of the base;
wherein:
acceleration and deceleration are related to a fore-aft movement of the vehicle, and said acceleration and deceleration commands are based on the operation of the hand operable control device;
and said translational motion is a lateral side-to-side motion of the vehicle and is controlled based on the operation of the hand operable control device when a moving direction information is input into the hand operable control device, and is controlled, based on the inclination of the base, when a moving direction information is not input into the hand operable control device.

* * * * *